(12) United States Patent
Wong

(10) Patent No.: US 10,166,473 B2
(45) Date of Patent: *Jan. 1, 2019

(54) SYSTEM AND METHOD TO PROVIDE AUGMENTED REALITY AND REMOTE GAMEPLAY FOR TRADITIONAL TRADING CARD GAMES

(71) Applicant: Justin Hanyan Wong, Atherton, CA (US)

(72) Inventor: Justin Hanyan Wong, Atherton, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/690,213

(22) Filed: Aug. 29, 2017

(65) Prior Publication Data

US 2018/0043259 A1    Feb. 15, 2018

Related U.S. Application Data

(63) Continuation-in-part of application No. 15/223,554, filed on Jul. 29, 2016.

(51) Int. Cl.
*A63F 9/24* (2006.01)
*G06F 17/00* (2006.01)
(Continued)

(52) U.S. Cl.
CPC ............ *A63F 13/52* (2014.09); *A63F 13/213* (2014.09); *A63F 13/25* (2014.09);
(Continued)

(58) Field of Classification Search
USPC .................. 463/1, 22, 29, 30, 32, 39, 40, 42
See application file for complete search history.

(56) References Cited

U.S. PATENT DOCUMENTS 5,662,332 A    9/1997  Garfield
7,314,407 B1*  1/2008  Pearson ................. A63F 13/12
                                                    463/29
(Continued)

OTHER PUBLICATIONS https://superdataresearch.com/content/uploads/2009/08/TCG2010.pdf.

*Primary Examiner* — Adetokunbo O Torimiro
(74) *Attorney, Agent, or Firm* — Kanika Radhakrishnan; Evergreen Valley Law Group

(57) ABSTRACT

A computer-implemented method and system to deliver enhanced augmented reality gameplay experience for Trading Card Games. The computer-implemented method includes setting up a gaming session with a plurality of Gamers through a user interface. The computer-implemented method includes scanning one or more relevant cards and identifying a Game Component represented by the relevant cards. The computer-implemented method includes retrieving a pre-defined sequence of animated movements of a 3D model of the Game Component from a database by the game server. Further, the computer-implemented method includes superimposing the sequence of animated movements onto the image of the trading card as captured by the camera of the gaming device, thereby giving the effect of the animated 3D model augmenting the real image of the static trading card so that the Game Component appears to be alive. Furthermore, the computer-implemented method includes capturing one or more actions taken on the Game Components by the Gamer by a plurality of Input Parameters. Moreover, the computer-implemented method includes detecting information on the actions captured and subsequently sending the information to the Gaming Server through the data network. The computer-implemented method includes generating Outcome Parameters by logically matching the one or more actions taken with the cards (Continued)

in play against one or more actions and cards in play by the opposing Gamer. The computer-implemented method also includes superimposing the actions of the Outcome Parameters thereby giving the effect of the animated 3D model augmenting the real image of the static trading card to display the consequence of the Gamers one or more actions. The computer-implemented method includes completing the gaming session until the end is reached, the end is defined by the rules of the TCGs being played.

40 Claims, 19 Drawing Sheets

(51) Int. Cl.
    *G06F 19/00*     (2018.01)
    *A63F 13/52*     (2014.01)
    *A63F 13/213*     (2014.01)
    *A63F 13/80*     (2014.01)
    *A63F 13/25*     (2014.01)
    *A63F 13/5255*     (2014.01)
    *A63F 13/69*     (2014.01)
    *A63F 13/35*     (2014.01)
    *A63F 13/92*     (2014.01)

(52) U.S. Cl.
    CPC .......... *A63F 13/5255* (2014.09); *A63F 13/69* (2014.09); *A63F 13/80* (2014.09); *A63F 13/35* (2014.09); *A63F 13/92* (2014.09)

(56) References Cited

U.S. PATENT DOCUMENTS

| | | | |
|---|---|---|---|
| 2009/0011743 A1* | 1/2009 | Johanson | H04M 3/42068 455/414.1 |
| 2011/0111854 A1* | 5/2011 | Roberts | H04N 7/17318 463/39 |
| 2011/0237331 A1* | 9/2011 | Doucet | A63F 13/10 463/32 |
| 2016/0361642 A1* | 12/2016 | Linden | A63F 13/213 |

* cited by examiner

SYSTEM AND METHOD TO PROVIDE AUGMENTED REALITY AND REMOTE GAMEPLAY FOR TRADITIONAL TRADING CARD GAMES

TECHNICAL FIELD

Embodiments of the disclosure relate generally to a trading card games. Embodiments relate more particularly to a computer-implemented method and system to provide augmented reality and remote gameplay for traditional trading card games.

BACKGROUND

Trading (or collectively) Card Games (TCG) including, but are not limited to, Magic: The Gathering, Yu-Gi-Oh!, and Pokemon, offers owners of trading cards lasting gameplay experience as well as monetary appreciation due to the collectability nature of the trading cards. These games are played between individuals using physical cards of varied design and capability in accordance with pre-defined gameplay rules. While TCGs based on physical cards still attracted a mass following across multiple demographics with worldwide sale in excess of $2.1 billion, the gameplay experience based on physical cards is dated when compared to the newer genre of computer- or console-base games that deliver robust graphics animation, 3D effect and sound effect, and might be a hindrance in attracting a new generation of TCG players and collectors. Furthermore, the traditional physical card based game is not conducive to gameplay involving remote competitors nor can easily be broadcasted to an audience using eSports online streaming media platforms. Computer based TCG using virtual cards are also available, however these products (i) fail to deliver the satisfaction of owning, admiring, trading, and playing with physical cards, and (ii) potential value appreciation associated with the ownership of physical cards. This invention adds a new augmented reality based pizzazz to traditional trading cards games that allow (i) trading cards publishers to push for the continued growth of physical card sales; and (ii) customers to realize the appreciated collector value of these cards.

U.S. patent Ser. No. 08/544,306 to Garfield et al describes a method of gameplay using physical trading cards. Using this method, two or more competitors (the "Gamers") compete using a selected number (or "hand") of physical cards that encompass different types of cards denoting various creatures, objects, skills, or special power (the "Game Components") that, when played correctly, can be used to neutralize the opponent's attacks or defenses based on established gameplay rules.

Augmented Reality goggles, headsets, or glasses ("AR goggles"), which can superimpose holographic images within its field of view ("FOV") onto real objects as observed through a transparent lens of the goggles, are approaching commercial viability. When complemented by built-in or externally attached scanner/camera and hand gesture sensor, such goggles can become a desirable gaming device that completely preserve the tactile experience of playing classical TCG as taught by Garfield et al while providing the enhanced entertainment effect of modern, broadcast-able 3D animated video games. The value of physical trading cards used in classical TCGs are also preserved as they are continued being purchased and used in competition.

In the light of the above discussion, there appears to be a need for providing augmented reality and remote gameplay for traditional TCGs.

OBJECT OF INVENTION

The principal object of the embodiments herein is to provide a computer-implemented method that delivers enhanced augmented reality gameplay experience using existing physical trading cards.

Another object of the embodiments herein is to allow multi-player TCG to be played face-to-face or remotely, or as broadcasted programming on eSports channels while preserving the traditional tactile gameplay experience of TCG played with physical cards as taught by Garfield et al.

Yet another object of the embodiments herein is to provide gameplay experience using existing physical trading cards and commercially available AR goggles as gaming devices to deliver an enhanced mixed virtual and physical gameplay experience, and generate content that can be broadcasted on eSports channels.

Another object of the embodiments herein is to use AR goggles or other gaming devices to display targeted entertainment, tutorial and/or advertising digital content based on the identity, preference, demographics or other characteristics of the Gamer.

Yet another objective of the embodiments herein is to enable the Gamer to obtain 3D-printed figures based on the 3D model of the Game Components in various poses for collecting, playing board games or other purposes.

SUMMARY

The above-mentioned needs are met by a computer-implemented method, computer program product and system to provide augmented reality and remote gameplay for traditional TCGs.

The computer-implemented method to deliver enhanced augmented reality gameplay experience includes setting up a gaming session with a plurality of Gamers through a user interface. The computer-implemented method includes scanning one or more relevant cards and identifying a Game Component represented by the relevant cards. The computer-implemented method includes retrieving a pre-defined sequence of animated movements of a 3D model of the Game Component from a database by the game server. Further, the computer-implemented method includes superimposing the sequence of animated movements onto the image of the trading card as captured by the camera of the gaming device, thereby giving the effect of the animated 3D model augmenting the real image of the static trading card so that the Game Component appears to be alive. Furthermore, the computer-implemented method includes capturing one or more actions taken on the Game Components by the Gamer by a plurality of Input Parameters. Moreover, the computer-implemented method includes detecting information on the actions captured and subsequently sending the information to the Gaming Server through the data network. The computer-implemented method includes generating Outcome Parameters by logically matching the one or more actions taken with the cards in play against one or more actions and cards in play by the opposing Gamer. The computer-implemented method also includes superimposing the actions of the Outcome Parameters thereby giving the effect of the animated 3D model augmenting the real image of the static trading card to display the consequence of the Gamer's one or more actions. The computer-implemented method includes completing the gaming session until the end is reached, the end is defined by the rules of the TCG being played.

An example of a computer program product to deliver enhanced augmented reality gameplay experience includes setting up a gaming session with a plurality of Gamers through a user interface includes scanning one or more relevant cards and identifying a Game Component represented by the relevant cards. The computer program product includes retrieving a pre-defined sequence of animated movements of a 3D model of the Game Component from a database by the game server. Further, the computer program product includes superimposing the sequence of animated movements onto the image of the trading card as captured by the camera of the gaming device, thereby giving the effect of the animated 3D model augmenting the real image of the static trading card so that the Game Component appears to be alive. Furthermore, the computer program product includes capturing one or more actions taken on the Game Components by the Gamer by a plurality of Input Parameters. Moreover, the computer program product includes detecting information on the actions captured and subsequently sending the information to the Gaming Server through the data network. The computer program product includes generating Outcome Parameters by logically matching the one or more actions taken with the cards in play against one or more actions and cards in play by the opposing Gamer. The computer program product also includes superimposing the actions of the Outcome Parameters thereby giving the effect of the animated 3D model augmenting the real image of the static trading card to display the consequence of the Gamer's one or more actions. The computer program product includes completing the gaming session until the end is reached, the end is defined by the rules of the TCGs being played.

An example of a system to deliver enhanced augmented reality gameplay experience includes multiple gaming devices to enhance the user experience through augmented reality while playing TCGs against one of face-to-face Gamers and remote Gamers. The gaming devices are configured with a camera and motion sensing capability and wherein the camera captures an image of one or more Game Components depicted in the trading card in play. The system also includes a Gaming Server to control the flow of the game and operated by one of the publishers of the trading cards used in a particular TCGs or any third-party interested in providing this gameplay experience. Further, the system includes a deck of trading cards for a particular TCGs, wherein the trading cards are composed with Game Components. Furthermore, the system includes a processing module configured within the gaming device and operable to perform: scan one or more relevant cards and identifying a Game Component represented by the relevant cards, retrieve a pre-defined sequence of animated movements of a 3D model of the Game Component from a database by the game server, superimpose the sequence of animated movements onto the image of the trading card as captured by the camera of the gaming device, thereby giving the effect of the animated 3D model augmenting the real image of the static trading card so that the Game Component appears to be alive, capture one or more actions taken on the Game Components by the Gamer by a plurality of Input Parameters, detect information on the actions captured and subsequently sending the information to the Gaming Server through the data network, generate Outcome Parameters by logically matching the one or more actions taken with the cards in play against one or more actions and cards in play by the opposing Gamer, superimpose the actions of the Outcome Parameters thereby giving the effect of the animated 3D model augmenting the real image of the static trading card to display the consequence of the Gamer's one or more actions; and complete the gaming session until the end is reached, the end is defined by the rules of the TCGs being played.

These and other aspects of/the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

DETAILED DESCRIPTION OF THE EMBODIMENTS

Figure 1:
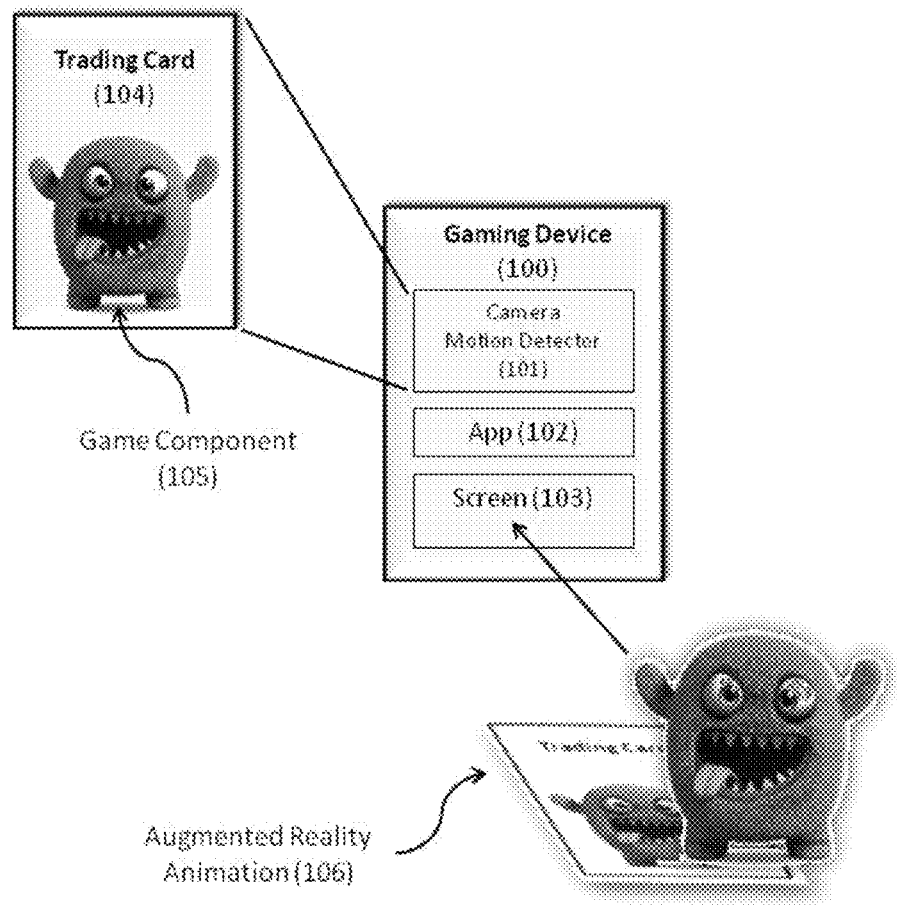
FIG. 1 is a block diagram of a system that interacts with Gamers to enhance the user experience of players of TCGs using augmented reality techniques in a preferred embodiment.

The above-mentioned needs are met by a computer-implemented method and system to allow a Gamer to experience augmented reality while playing traditional TCG using physical trading cards. The following detailed description is intended to provide example implementations to one of ordinary skill in the art, and is not intended to limit the invention to the explicit disclosure, as one of ordinary skill in the art will understand that variations can be substituted that are within the scope of the invention as described.

This invention delivers enhanced entertainment value to Gamers and the audience viewing classical TCGs using physical trading cards as well as improved flexibility in organizing gameplay.

The present application describes a novel system in which a Gamer first download a specialized TCG playing application (the "App") to the Gaming Device. The Gamer then uses the App, which controls the camera on the Gaming Device, to scan and identify the physical card in play. Once the physical card has been identified, the identity information is sent to the Gaming Server via a data network to retrieve from a database the gaming rules and 3D model with pre-defined sequence of animated movements associated with the physical card in play. Using either the computing power on the Gaming Device or on the Gaming Servers, the Gamer will observe on the screen of the Gaming Device the Game Component(s) on the physical card "come alive" through animating and transforming a 2D image of the physical card into a 3D model of the Game Component(s) on the screen of the Gaming Device. The movements of the animated 3D model of the Game Component(s) will be determined by the Input Parameters consisting of: (i) the identity of the trading card in play; (ii) the action taken by the Gamer as detected by the Gaming Device's camera or motion detection device; and (iii) the pre-defined rules of the TFG.

This present invention allows for multiple Gamers to compete with each other either face-to-face or in remote setting each using an individually selected deck of physical cards from the Gamers' collection (the "Gaming Session"). Each Gamer can initiate a Gaming Session by logging-in to the Gaming Server and start a game by inviting other Gamers to join. A game can be "closed" involving Gamers known to each other by having the invitation sent only to Gamers designated by the initiating Gamer via email, text messaging, chat, or through the App. A "pick-up" game can also be initiated when the invitation is sent through the App to all Gamers who indicated an interest in playing a "pick-up" game. Once a Gaming Session has been initiated and two or more Gamers logged in, information related to the identity of the card in play and action taken by the Gamer are send via data network to the Gaming Server. Based on the gaming rules associated with the particular TCG, the Gaming Server can determine the outcome of the Gamers' action(s) vis-a-vis the opposing Gamer. The outcome of the Gamers' action is also stored in a database on the Gaming Server for score keeping purposes. The Gaming Service will also send a sequence of animated 3D model movements based on the outcome via data network to the screen of the Gaming Device of the respective Gamers as visualization of the outcome (the "Outcome Parameters"). Such sequence of animated movements could connote the state of the Game Component including, but not limited to, death, injury, joy, growth, etc. in accord with the outcome. The Gamming Session can continue until the end goal of the TCG, as defined in the pre-defined rules for the TCG being played, is achieved.

Environment Block Diagrams

FIG. 1 is a block diagram of a system that interacts with Gamers to enhance the user experience of players of TCGs using augmented reality techniques in a preferred embodiment.

In accordance with the embodiments shown in the drawings, Gamers can use their Gaming Devices (100) to enhance the user experience through augmented reality while playing TCGs against either face-to-face or remote Gamers. Similar to traditional TCGs, physical trading cards which are prized for their collector value are used. A trading card in play (104) is scanned by the camera (101) built into the Gaming Device (100). Through identification techniques including, but not limited to, optical character recognition of the title of the trading card or serial number, graphical recognition of the Game Component (105), or scanning special barcode (e.g., a QR code) by the App (102) running on the Gaming Device (100), the Game Component (105) represented by the physical trading card in play is identified. The App can service one or more types of TCG(s) depending on the business objectives of the operator of the Gaming Server (200). This information is sent to the Gaming Server (200) via the data network (202) where certain predetermined animated sequence of the 3D model associated with the Gaming Component (105) is fetched from the database (201) and returned to the Gaming Device (100). The 3D animation will be shown on the screen (103) of the Gaming Device (100) where the Game Component (e.g., the monster) (105) appears to "come alive" and arise from the flat physical trading card shown on screen (106) as captured by the camera (101).

The system can also be set up to facilitate a tournament among players, and/or broadcast the games through an eSports channel. This is done using computing devices including, but not limited to smart phones, tablet computers, or augmented reality goggles with camera and motion sensing capability, traditional trading cards used in games such as Magic: the Gathering, Yu-Gi-Oh!, Pokemon, etc., and a Gaming Server accessing a database related to the TCG in play.

Figure 2:
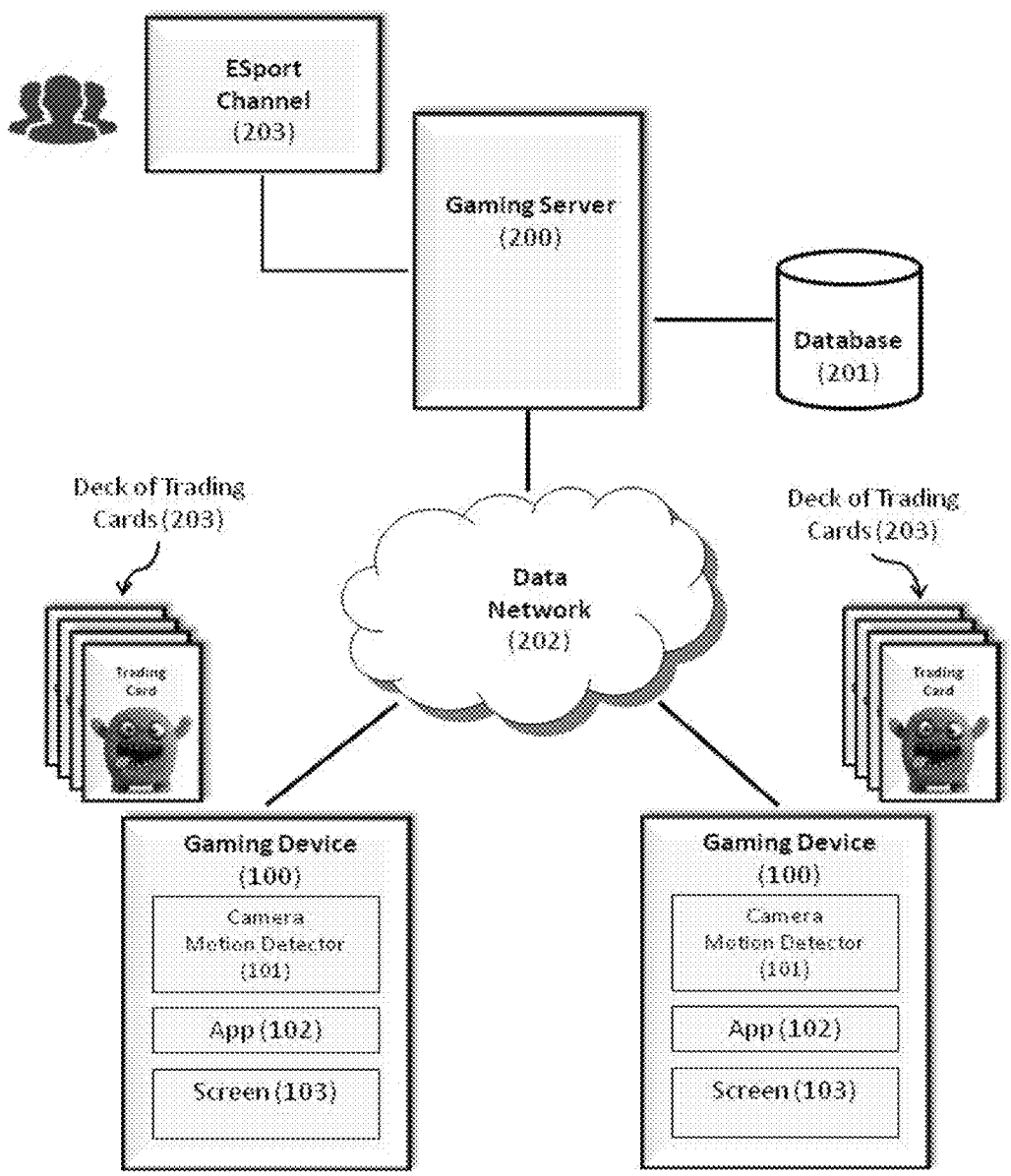
FIG. 2 is a block diagram of multiple Gamers participating in an augmented reality enhanced TCG either face-to-face or remotely in a preferred embodiment, and broadcast of the Gaming Session to eSports channels in an alternate embodiment.

FIG. 2 is a block diagram of multiple Gamers participating in an augmented reality enhanced TCG either face-to-face or remotely in a preferred embodiment, and broadcast of the Gaming Session to eSports channels in an alternate embodiment.

Referring to FIG. 2, the gameplay system consists of a Gaming Device (100) which serves as the primary interface with the Gamer. Each Gamer will place a deck of physical cards (203) in play. The deck of cards for a particular TCG can be curated by the Gamer from his/her collection prior to the game and pre-scanned into the system, or can also be assembled during game time. The number of cards in the deck or the composition of Game Components selected will depend on the Gamer's gaming strategy and the rules of the particular TCG being played. Each Gamer is required to have his/her separate Gaming Device (100) and deck of cards (203).

Further on FIG. 2, the multiple Gaming Devices (100) are connected, using proprietary or public Data Network (202) to the Gaming Server (200). The Gaming Server controls the flow of the game (see below for a detailed description of the flow of the gameplay based on the flow diagram FIG. 4), and stores Gamers' login and account information, scores and other relevant data in a database (201). This Gaming Server (200) can be operated by the publisher of the trading cards used in a particular TCG, or any third-party interested in providing this gameplay experience.

In an alternate embodiment of this invention, the Input Parameters and Outcome Parameters of each step of the Gaming Session for each Gamer are sent to an eSports channel (203) for broadcast to an audience for on-demand or live viewing of the gameplay.

It should be appreciated by those of ordinary skill in the art that FIG. 1 depicts the gaming device (100) in an oversimplified manner. A practical embodiment may include additional components and suitably configured processing logic to support known or conventional operating features as described in FIG. 5.

The embodiments herein allow for the delivery of enhanced augmented reality gameplay experience for TCG using a variety of Gaming Devices. In the particular case of using an AR goggle as a Gaming Device in a TCG, the physical cards are scanned prior to gameplay to identify the Game Component printed on the cards. The scanning function can be performed by the AR goggle's built-in camera, externally attached camera or a separate mobile device. The Game Component can be identified through the scanning of a 1D or 2D barcode (e.g. a QR code) affixed or printed (i) on the card, or (ii) on a translucent plastic sleeves typically used to protect the cards from wear and tear. The Gamer can register the cards in their collection by scanning the barcode using the camera as noted above and type in the name or other identification information of the card to associate the unique serial number to the specific card. (i) Ownership data, (ii) the unique serial number as encoded in the barcode, and (iii) identification information of the Game Component depicted on a specific card is transmitted via data network to be stored in a database on the publisher's deck building or other web sites related to the specific TCG being played. These data can be used to identify the specific card in play during gameplay, or analyzed to (i) provide additional commercial, entertainment or tutorial content to card owners to enhance their game playing experience, or (ii) forward the commercial goals of the card publisher.

For existing trading cards in circulation, affixing an identification barcode would adversely affect the esthetics of the cards. Hence, affixing the barcode on the protective sleeve is a better approach. For newly published cards, it is possible to design the barcode onto the cards without impacting their overall esthetics.

As the physical trading card is played, the AR goggle's built-in or externally attached camera reads the barcode affixed to the card in play or the protective sleeve of said card. An app running on the AR goggle decodes the barcode and the serial number the barcode represents is transmitted via data network to a database hosted on the Gaming Server. Through database query, the Game Component on the card associated with the serial number is identified and the appropriate holographic animation file of the 3D model of the Game Component is retrieved from storage and sent via data network to the AR goggle. The AR goggle will play the content of the holographic animation file, superimposing the holographic animation movement of the 3D model onto the physical card as seen through the lens of the AR goggle.

An alternate approach to scanning a barcode affixed to the physical playing card or a protective sleeve is to utilize image recognition software running in the app of the Gaming Device or on a remote server. The built-in or external attached camera of the Gaming Device including, but not limited to an AR goggle, will take a snapshot of the physical card, and the app running on the Gaming Device or software running on a remote server will analyze the snapshot to detect discernible features ("Identity Markers") in the image (e.g., the legs of a spider or wings and horns on a gargoyle) to identify the Game Component associated with the card. The specific card with the identified Game Component is assigned a unique serial number by the Gaming Server. By linking this unique serial number with ownership or other information as noted above, the card is registered and ready for play. At playtime, the AR goggle's built-in or externally attached camera will detect and use the Identity Markers of the card in play to look up the serial number of the card, and proceed in accordance with the procedure noted above for the barcode approach. The Identity Markers that can be used to identify the Game Component could be any special features in the "look" of the image of the Game Component. For ease of quick identification of a Game Component during playtime, unique Identity Markers can also be drawn into the "look" of the image of the Game Component to assist the image recognition software in identifying the Game Component.

The holographic animation files transmitted can be categorized as: (i) "emergence" where the 3D model of the Game Component (i.e., the creature) appears to emerge from the physical card as seen through the AR google; (ii) "dynamic idle" where the animated 3D model of the Game Component is moving about on top of the physical card waiting for actions taken on the Game Components by the Gamer using hand gesture commands in accordance with the rules of the TCG being played; (iii) "attack/defend" where the animated 3D model of the Game Component performs, as viewed through the AR goggle, a sequence of movements in an attack or defensive pose appropriate for the Game Component in accordance with the rules of the TFG, (iv) "conclusion win", and (v) "conclusion loss" where the Output Parameters, as generated by the Gaming Server by logically matching the one or more actions taken with the cards in play against one or more actions and cards in play by the opposing Gamer, are visually displayed using an animated 3D model of the Game Component based on the rules of the TFG being played. The Gamer can see and interact with the physical cards being played in the field of play (e.g., a table) as well as the competing Gamer (if face-to-face) and the surrounding as if he/she is playing the TCG before the advent of augmented reality. In case of playing with a remote competitor, the Gamer will see the competitor's card deck as virtual images projected onto the lens of his/her AR goggle. The opponent's virtual cards are displayed across from his/her physical card deck on the table in front of him/her as if he/she is playing against a face-to-face opponent.

A merchandising business can also be established beyond the selling of the physical cards and protective sleeves with barcode. With the advent of 3D printing technology, the Gamer can order 3D-printed figures of the 3D model of the Game Component in various poses through a user interface on the AR goggle or through an online store. The 3D figures can be used for personal collection, game pieces in board games or other purposes.

Certain TCG defines a category of special cards (e.g. artifact or enchantment cards) whose function is to enhances the capability of the cards in play. When such a card is selected and placed in the field of play, the Gamer will be able to gaze at the physical card through the transparent lens of the AR goggle and the camera on the AR goggle will be able to identify the card using the affixed barcode or image recognition technique. In accordance with the rules of the TFG being played, information regarding the special capability of the card will be retrieved from the game server and displayed within the FOV of the AR goggle. Special marking or prompt may also be displayed by the AR goggle to indicate which card(s) will be impacted and what specific capability the special card imparts.

In accordance with the rules of play of certain TCG, each Gamer can directly attack the opposing Gamer using the capability of a Game Component in play. To enhance the realism and entertainment value of the gaming experience, a holographic avatar representing the opposing Gamer in face-to-face gameplay can be projected onto the lens of the AR goggle superimpose on the physical Gamer as viewed through the lens of the AR goggle. Only the avatar is shown floating in space in case of remote gameplay as there is no physical Gamer viewable through the lens of the AR goggle. Each Gamer-selectable avatar is displayed in a number of animated holographic movements including, but not limited to, "dynamic idle", "vitalized" and "expiration".

Additional graphical elements can also be displayed within the AR goggle's FOV to enhance the Gamer's gameplay experience. This include, but not limited to, (i) a facsimile image of the selected card being played, (ii) score or other game playing parameters (e.g. health points) in accordance with the rules of the TFG being played, (iii) listing of special capabilities evoked to strengthen the selected card(s) (e.g. artifact or enchantment) in accordance with the rules of the TFG being played. Most physical cards contain a written description in very small font of the capabilities of the cards or the rules related to playing the cards. A facsimile image of the selected card is retrieved from the database and displayed on the side of the FOV, allowing the Gamer to read the rules or instruction without having to pick up and read from the physical card. In order to not obscure the view of the physical cards in play, a partial facsimile image of the selected card is projected onto the edge of the FOV. The Gamer can slightly turn his head in the direction of the image to move the complete image of the selected card to within the FOV for easy reading.

Operational Flow Charts

Figure 3:
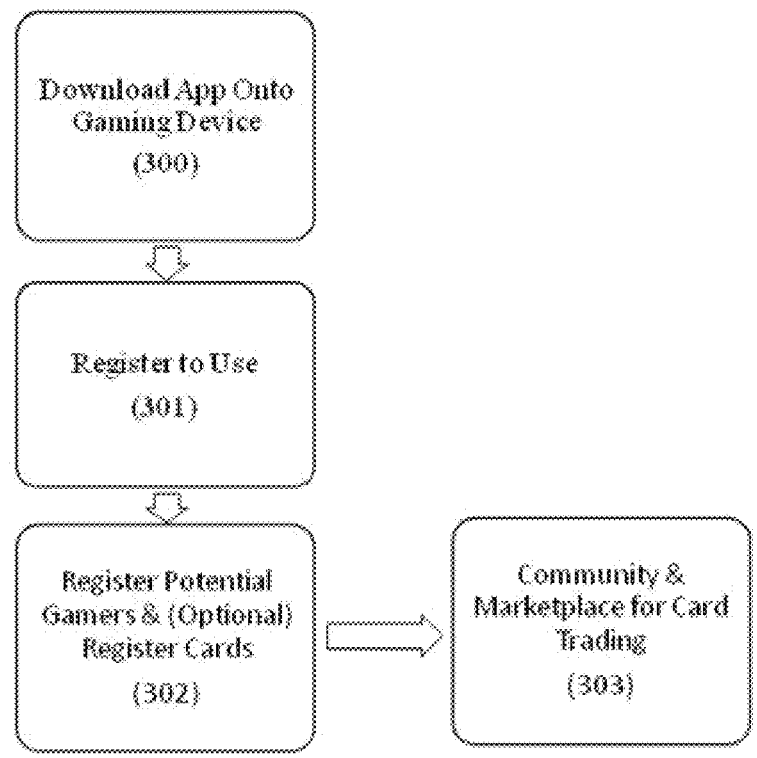
FIG. 3 is a flow diagram describing the initialization process for Gamers to register with the system.

FIG. 3 is a flow diagram describing the initialization process for Gamers to register with the system.

As shown in FIG. 3, a new Gamer has to first download the App (300) from a trusted source relevant to the Gaming Device (100) including, but not limited to, an application store runs by the manufacturer of the Gaming Device (100), the web site of the inventor, or the web site operated by the publisher of the trading cards use in a particular TCG. Depending on the business strategy of the publisher of the trading cards used in a particulate TCG, the App (102) might be designed (i) specifically for a particular TCG; (ii) for all or multiple TCGs from the same publisher; or (iii) for certain category of TCG. After the App (102) is downloaded, the Gamer will be required to enter (301) certain name, login security, billing, skill level or personal preference information (e.g., "Are you interested in participating in playing 'pick up' games?"). To complete the initialization process, the Gamer is asked to enter the contact information of other Gamers that should be invited to participate in future Gaming Sessions (302). The invitees will be contacted via email, instant messaging, chat, or other means of communication preferred by the publisher of the trading cards requesting their acknowledgement of the invitation. If the invitees do not have the App installed on their Gaming Devices, they will also be asked to download the App. Another aspect of the registration process (302) is to allow the Gamer to register their collection of trading cards related to the TCG the App support. News and other information related to his/her inventory of trading cards can be pushed directly from the publisher to the Gamer via the mode of communication of the Gamer's choosing. Card registration and ownership information will be used as input to a secured card trading platform (303) that is branded and controlled by the publisher of the trading cards so as to develop a community and marketplace that: (i) extends the reach of an average Gamer to a broader, potential worldwide population of traders with interest in this type of trading cards; (ii) facilitates the frictionless flow of information that can help set the collector value of trading cards; and (iii) serves as a more secured channel for the trading of cards.

Figure 4:
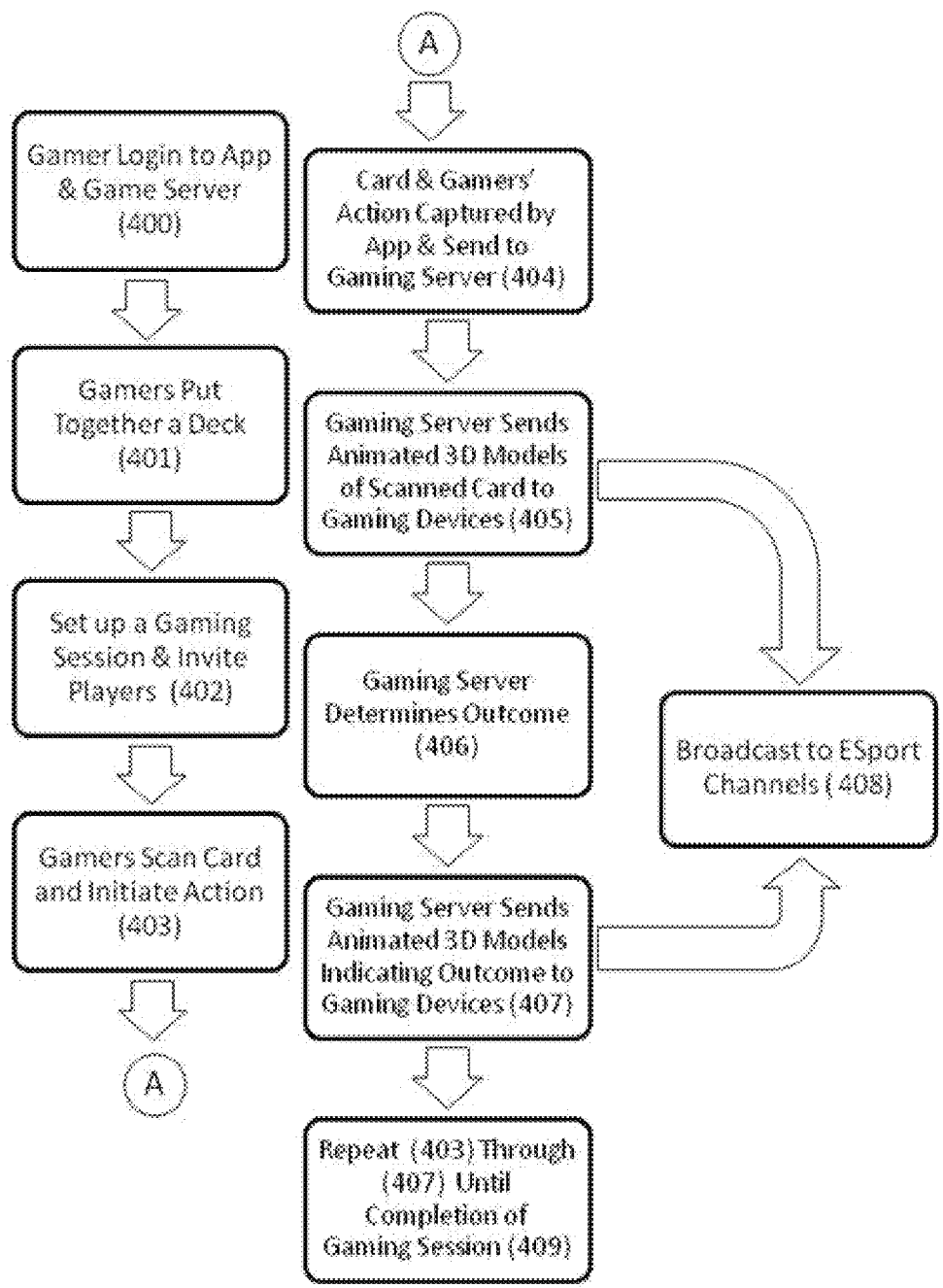
FIG. 4 is a flow diagram describing the process of playing an augmented reality enhanced TCG in a preferred embodiment, and broadcast of the Gaming Session to ESport channels in an alternate embodiment.

FIG. 4 is a flow diagram describing the process of playing an augmented reality enhanced TCG in a preferred embodiment, and broadcast of the Gaming Session to eSports channels in an alternate embodiment.

FIG. 4 describes the process in the preferred embodiment of setting up and playing an augmented reality enhanced TCG using physical trading cards.

First the Gamer log into the App (102) and the Game Server (200) using his/her log in credential established in the initialization process (301). Once logged in (400) the Gamer curates a physical deck of treading card (a "hand") that will be used in the present Gaming Session (401). Furthermore, he/she sets up a Gaming Session using the user interface of the App (402). If the App supports multiple TCGs, he will have to choose the TCG that he/she intends to play, the timing of the Gaming Session, as well as input the parameters required based on the rule of that TCG. He/she will decide whether he/she would like to invite specific Gamers to join him in this Gaming Session, or whether he/she would like a "pick-up" game where other interested Gamers that are not specifically invited by the organizing Gamer can join in the game at the time suggested by the organizing Gamer. All Gaming Sessions can be conducted face-to-face or remotely among geographically dispersed Gamers.

Once all participating Garners are present, each Garner will scan the relevant card(s) and take action in attack, defensive or other postures as stipulated in the rules for the TCG (403). The identity of the Game Component represented by the card in play is determined by the App based on the aforementioned techniques. Identity information is sent to the Game Server (200) via the Data Network (202). Referring to item (405), a sequence of movements of a 3D model of the Game Component is retrieved from the Database (201) by the Game Server (200) and sent to the Gaming Device (100) via the Data Network (202). The App (102) on the Gaming Device (100) will superimpose on screen (103) this animated sequence onto the image of the physical trading card (104) as captured by the camera (101) of the Gaming Device (100). This gives the effect of the animated 3D model augmenting the real image of the static trading card (104) so that the Game Component appears to "come alive" (105).

The action(s) taken by the Garner, for example, pushing the card forward, or placing the card horizontally or vertically, or tapping on the card, etc. in accordance with the rules of the TCG being played is captured by a built-in or externally mounted motion detection device (101) incorporated into the Gaming Device (100). Information on the motion detected is also sent to the Gaming Server (200) via the Data Network (202).

Once the Input Parameters are received by the Gaming Server (200) from all opposing Garners in this one step of the Gaming Session, the Gaming Server (200) can determine the Outcome Parameters of this step by logically matching the action(s) taken with the card(s) in play against the action(s) and card(s) in play by the opposing Garner (406). The Outcome Parameters are generated and stored in the Database (201) for score keeping purposes. In addition to storing the Outcome Parameters in the Database (201), the Gaming Server (200) will also send the Outcome Parameters as represented by a sequence of animated 3D model for each Game Component in play in this step of the Gaming Session (407) to the Gaming Devices (100) of the participating Garners. The App (102) on the Gaming Device (100) will superimpose on screen (103) this animated sequence on the image of the physical trading card (104) as captured by the camera (101) on the Gaming Device (100). This gives the effect of the animated 3D model augmenting the real image of the static trading card (104) to display the consequence of the Garners' action(s), for example, showing the loser being destroyed or the winner doing a dance in celebration (106).

In an alternate embodiment of this invention, the Input Parameters from process step (405) and the Outcome Parameters from process step (407) are sent to eSports channels for broadcast to the general audience (408) who are not the participating Gamers.

Process steps (403) through (407) are repeated until the end of a Gaming Session as defined by the rules of the TCG being played is reached. In an alternate embodiment of this invention, the Gaming Server (200) can set up a series of Gaming Sessions and assign registered Gamers to compete in groups so that Gamers, either in face-to-face or remote competitions, can participate in a TCG tournament that will generate a champion as the final result.

Using the TFG Magic: the Gathering as an example, Player#1 has a two summoned monsters (Monster#1 and Monster#2) in play. His/her goal is to attack Player#2 with one and defend himself with another. Using the Gaming Device, Player#1 will scan the cards in play which then animates the various creatures on the field. Player#1 pushes the card representing Monster#1 forward to attack (the attack action for monster is to push the physical card forward). Player#1 then taps the physical card that represents Monster#2 with his/her finger and turns the card horizontal. Player#1's Gaming Device will recognize this action and put Monster#2 into a defensive pose. When Player#1 is done with all his/her actions and Player#2 is done with his reactions to Payer#1's actions by taking actions on cards from his/her deck, Player 1's monster will attack. The attack will be portrayed through the screens of the Gaming Devices of the Gamers with the 3D model representing Monster#1 lunging in and attacking superimposed on an image of the physical card, and the outcome of the skirmish again displayed on the screens of the Gaming Devices of the Gamers.

In one embodiment of the invention, a Gaming Session can be paused and resume at a later time by a participating Gamer anytime during a session.

In an alternate embodiment of the invention is for the Gamer to scan the trading cards in his/her collection to create a library of cards in his/her collection. The identity of the cards is stored in the Gaming Server in the account of the Gamer. From this library, decks for specific opponents can be curated ahead of the Gaming Session. Information and value of the trading cards in the library can also be searched and displayed on demand using the App. The App also provides input to a card trading platform which serves as a community and marketplace for Garners to auction or trade their cards to one another in a controlled, monitored environment to ensure minimum graft and conflict.

In still another alternate embodiment of the invention, multiple Gaming Sessions can be conducted either in parallel or over a period of time. A multi-Garner tournament can be facilitated by having the Gaming Server automatically initiate new Gaming Sessions involving winning Garners' match up in follow-on Gaming Sessions in round-robin or elimination fashion until an over-all winner can be established.

In yet another alternate embodiment of the invention, the Input Parameters and the Outcome Parameters to the Gaming Server can be channeled to eSports channels where Gaming Sessions or complete tournaments can be broadcasted for live or on-demand viewing by audiences of said eSports channels.

Block Diagram of Gaming Device

Figure 5:
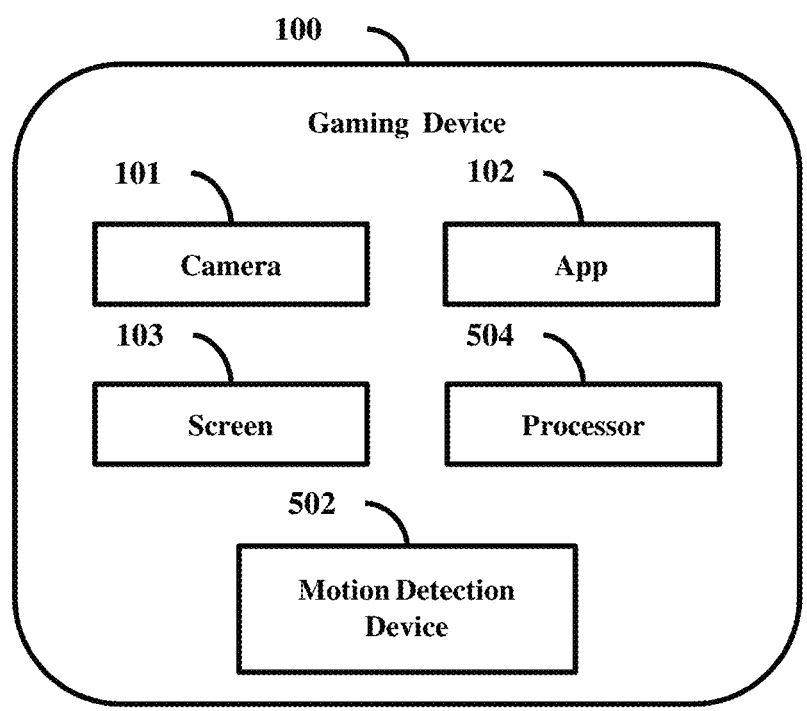
FIG. 5 is a block diagram of a gaming device, according to the embodiments as disclosed herein.

FIG. 5 is a block diagram of a gaming device, according to the embodiments as disclosed herein. The gaming device (100) includes the camera (101), the App (102), the screen (103), motion detection device (502) and a processor (504).

The camera (101) scans and identifies a trading card in play. Further, the camera is capable of capturing action(s) taken by the Garner.

The App (102) is a specialized TCG playing application and allows the users to perform the method described herein.

The screen (103) enables an animated 3D model of the Game Component(s) that "comes alive" and appears to emerge from the 2D image of the physical card to do battle or competing with the opponent's creature(s) as directed by the Garner in accordance with established gameplay rules.

The motion detective device (502) detects the action(s) taken by the Garner. In some embodiments, the motion detective device may be an external device that is connected to the Gaming Device (100).

The processor (504) is configured with a non-transitory computer-readable medium, the contents of which causes the gaming device (100) to perform the method disclosed herein.

System Block Diagram

Figure 6:
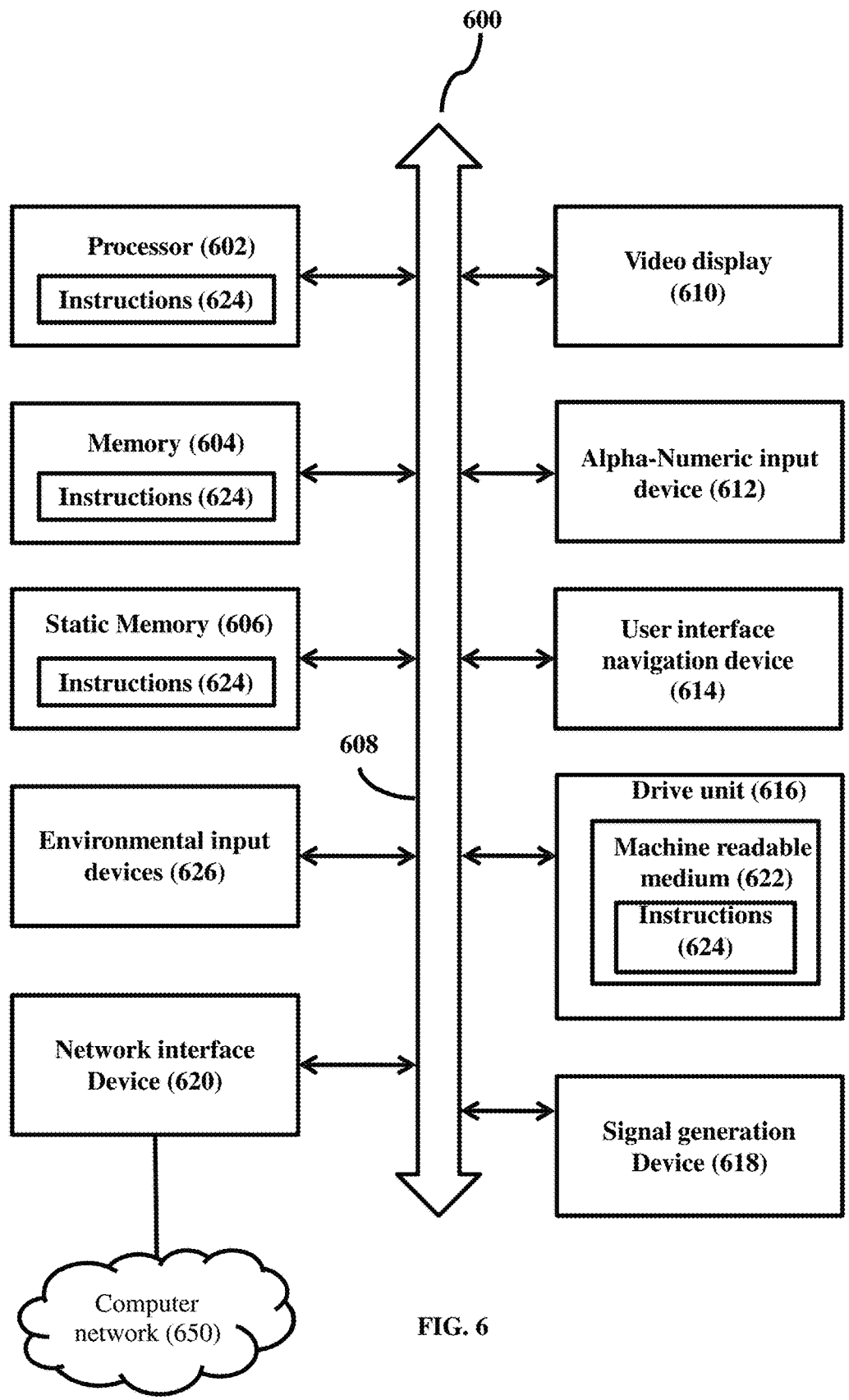
FIG. 6 is a block diagram of a machine in the example form of a computer system within which instructions for causing the machine to perform any one or more of the methodologies discussed herein may be executed.

FIG. 6 is a block diagram of a machine in the example form of a computer system within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system (600) includes a processor (602) (e.g., a central processing unit (CPU), a graphics processing unit (GPU), or both), a main memory 604, and a static memory (606), which communicate with each other via a bus (608). The computer system (600) may further include a video display unit (610) (e.g., a liquid crystal display (LCD) or a cathode ray tube (CRT)). The computer system (600) also includes an alphanumeric input device (612) (e.g., a keyboard), a user interface (UI) navigation device (614) (e.g., a mouse), a disk drive unit 616, a signal generation device (618) (e.g., a speaker), and a network interface device (620). The computer system (600) may also include a environmental input device (626) that may provide a number of inputs describing the environment in which the computer system (600) or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit (616) includes a machine-readable medium (622) on which is stored one or more sets of data structures and instructions (624) (e.g., software) embodying or utilized by any one or more of the methodologies or functions described herein. The instructions (624) may also reside, completely or at least partially, within the main memory (604) and/or within the processor (602) during execution thereof by the computer system (600), the main memory (604) and the processor (602) also constituting machine-readable media.

While the machine-readable medium (622) is shown in an example embodiment to be a single medium, the term "machine-readable medium" may include a single medium or multiple media (e.g., a centralized or distributed database, and/or associated caches and servers) that store the one or more instructions (624) or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions (624) may further be transmitted or received over a computer network (650) using a transmission medium. The instructions (624) may be transmitted using the network interface device (620) and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans or Enterprise Java Beans. Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standard 802.11 including its substandards a, b, e, g, h, i, n, et al.). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

AR Goggle as Gaming Device

Figure 7:
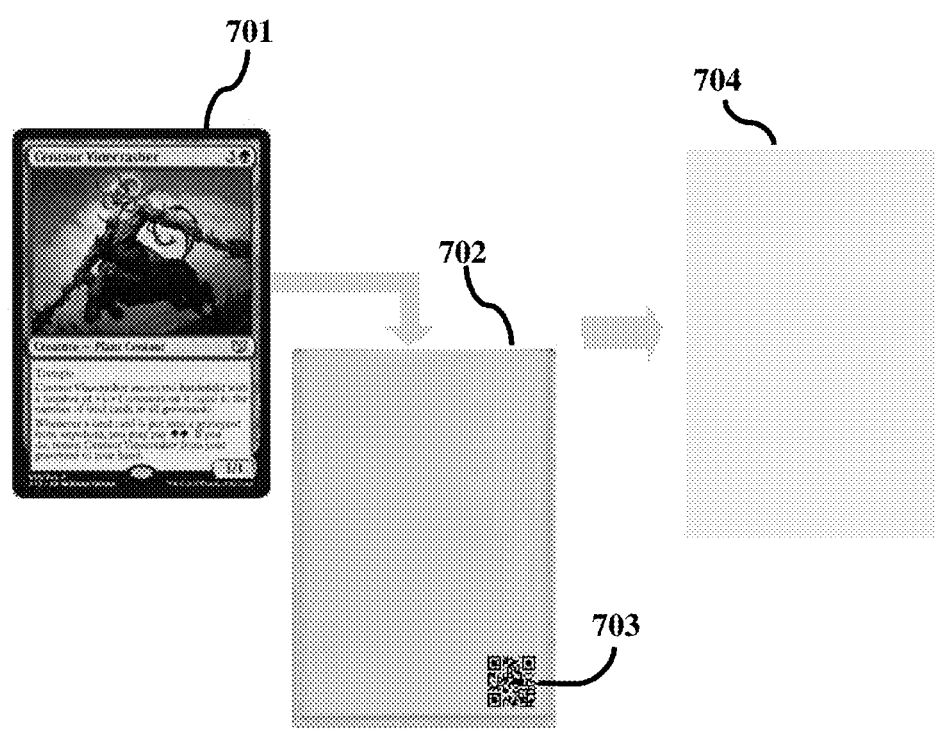
FIG. 7 is a block diagram showing the use of a protective plastic sleeve to provide camera readable barcode on physical cards currently in circulation that lacks such identification code.

FIG. 7 is a block diagram showing the use of a protective plastic sleeve (702) to provide camera readable barcode on physical cards currently in circulation that lacks such identification code. In the particular case of using AR goggle as the Gaming Device, such barcode has to be readable by the AR goggle's built-in or externally attached camera.

Further in the case of using barcode to enable the identification of a Game Component in real time, a 1D or 2D barcode (703) can be affixed to the physical card (701) so the unique serial number encoded in the barcode (703) can be associated with the Game Component represented by the card. For existing cards in circulation, directly affixing such a barcode onto the card in the form of a sticker will adversely impact the esthetics of the card and diminish its collector value. In this present invention, the identifying barcode (703) is either printed or affixed using a sticker onto a protective plastic sleeve (702) typically used to protect the physical card (701) from wear and tear. The physical card (701) is inserted into the protective sleeve (702) and the combine unit (704) is used in gameplay.

Figure 8:
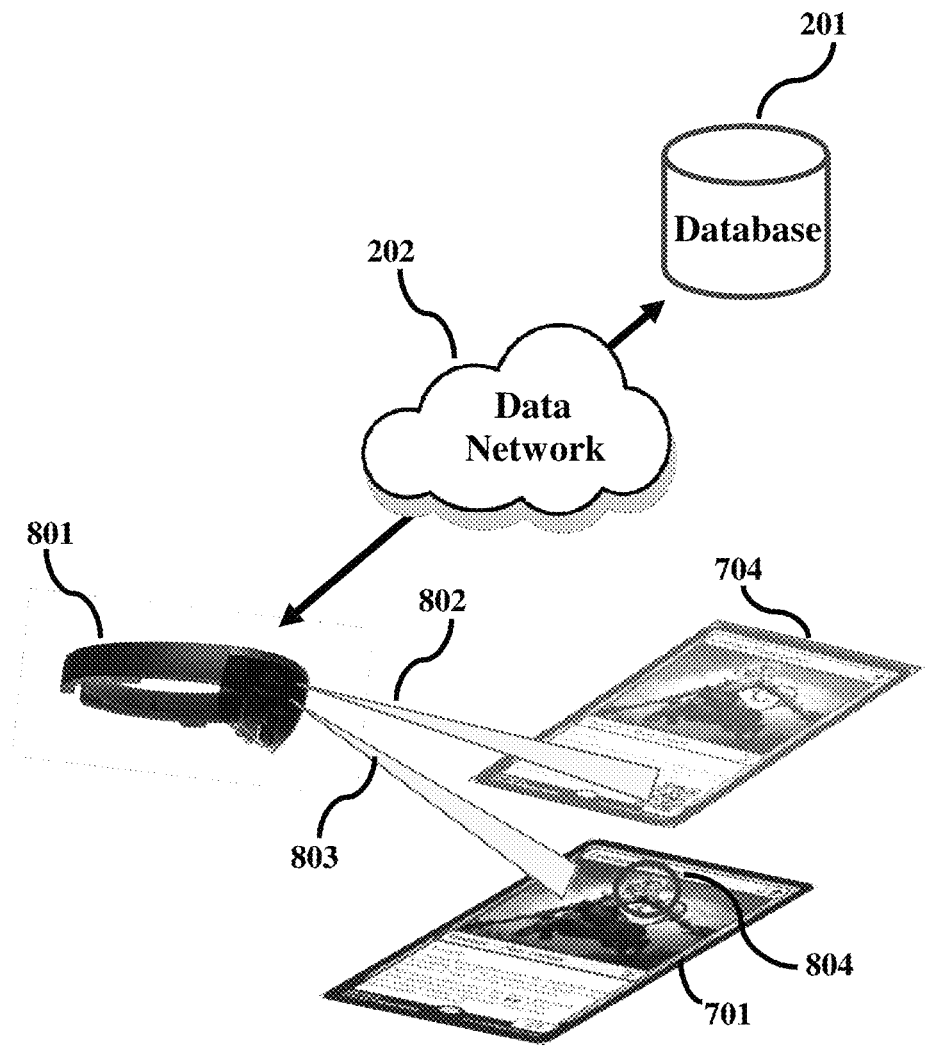
FIG. 8 is a block diagram showing how an AR goggle is used to scan the identification barcode or Identity Markers on a physical card to identify the Game Component depicted in the physical card, and the data transmitted to a database.

FIG. 8 is a block diagram showing how an AR goggle is used to scan the identification barcode or Identity Markers on a physical card to identify the Game Component depicted in the cards, and the data transmitted to a database.

An AR goggle is an electronic device that has a clear lens allowing the wearer to observe physical objects placed in front of the wearer as well as his/her surroundings like normal optical glasses. In addition, an AR goggle also performs additional functions including, but not limited to, (i) built-in or externally attached camera, (ii) built-in or externally attached motion or hand gesture sensor, (iii) heads-up display (HUD) projector that projects a holographic image onto the lens within the FOV such that the image appears to be superimposed onto the physical objects observed through the lens, and (iv) a computing system as described in FIG. 6.

The AR goggle's (801) built-in or externally attached camera scans (802) the barcode affixed to or printed on the protective sleeve (702) of the combined unit (704) consisting of the card (701) and protective sleeve (702). The barcode is decoded by the AR goggle (801) and the unique serial number encoded in the barcode is transmitted to the database (201) maintained by the TCG publisher via the data network (202). Instead of an AR goggle, a mobile device—like a cell phone or a tablet computer—with a built-in camera can also be used to scan the barcode. Through a user interface projected by the HUD in the AR goggle or on the screen of the mobile device, the Gamer can enter: (i) the name or other information identifying the Game Component associated with the card being scanned, and (ii) ownership information of the Game Component if different from the ownership information of the AR goggle or mobile device, or default to the ownership information of the AR goggle or mobile device. Through this process, the unique serial number encoded in the barcode is now associated with the particular card scanned and the data being stored in the database (201).

Instead of scanning the barcode (802), image recognition software can be implemented on the AR goggle (801), mobile device or on a server across the data network. The AR goggle's built-in or externally mounted camera or mobile device can take a snapshot (803) of the physical card (701). The image recognition software can analyze the snapshot to deduce unique graphical features (e.g., the legs of a spider or wings and horns on a gargoyle) or Identity Markers on the Game Component under examination, and based on these features, identify the Game Component without the need for any barcode. Once the identification is achieved, a unique serial number is assigned to the card. This assigned serial number is associated with the identification of the Game Component and the ownership information as determined by the ownership information of the AR goggle, mobile device, or as entered by the Gamer using a user interface projected by the HUD in the AR goggle or on the screen of the mobile device. The data is stored in the database (201).

Figure 9:
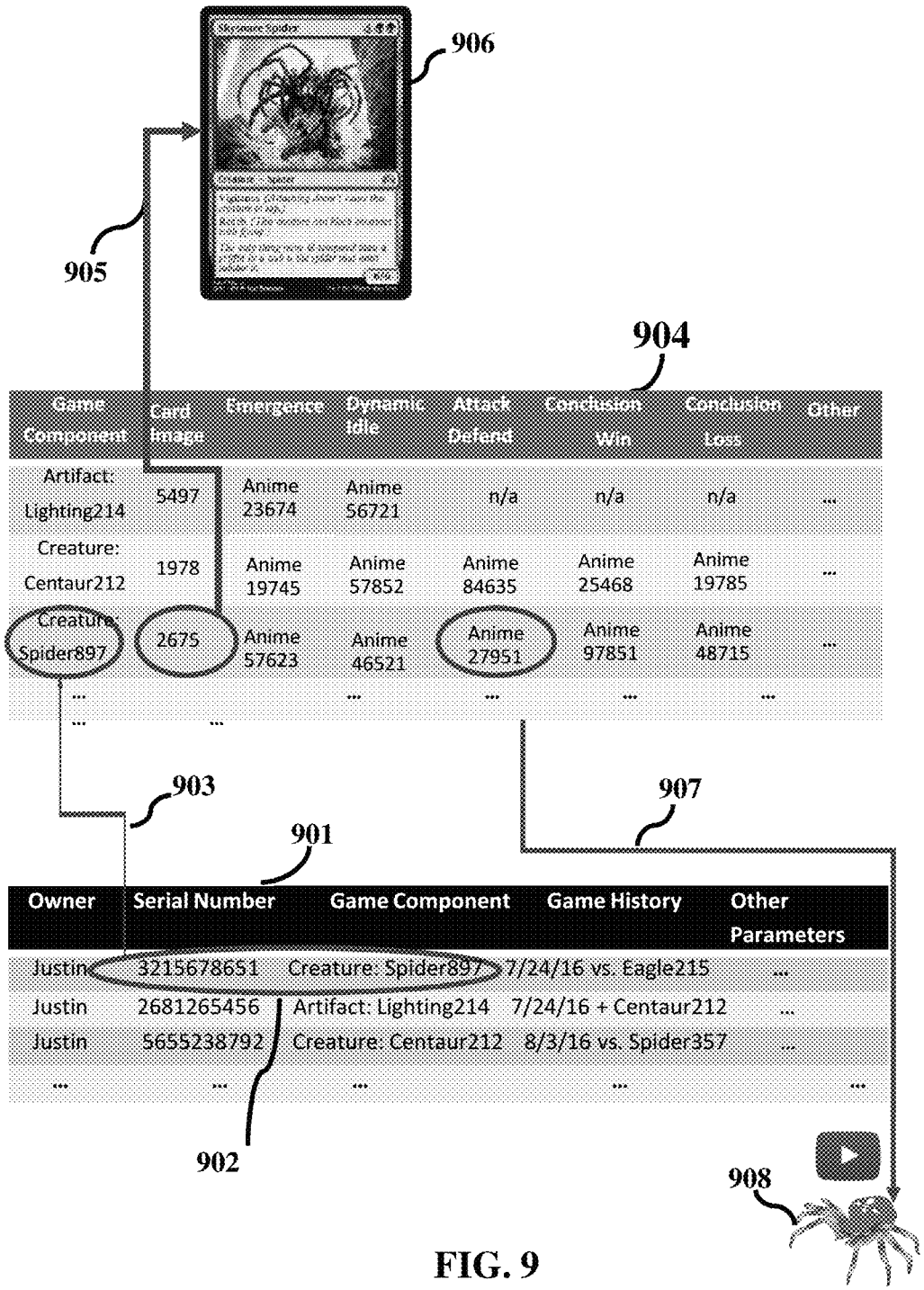
FIG. 9 is a data flow diagram showing how data is stored and retrieved to provide augmented reality and remote gameplay for traditional TCGs.

FIG. 9 is a data flow diagram showing how data is stored and retrieved to provide augmented reality and remote gameplay for traditional TCGs.

The unique pairing of serial number and the Game Component's identification information (902) and the Gamer's identification (as collected through the App (102) installed on the Gaming Device (100) and in this case, the AR goggle) are transmitted to the database (201) via the data network (202). The data are stored in the Gamer data table (901) that collects data on the Gamer's card ownership and gaming activities. Additional fields in the data table store additional data including, but not limited to, gaming history, experience level, preference, etc.

The Game Component's identity (e.g. Creature:Spider 897) stored in the Gamer data table (901) are linked (903) to a row in the Game Component data table (904) for the same Game Component (e.g. in this case the row for Creature:Spider 897). The data table (904) consists of a number of fields that define the appearance of the Game Component and its physical card including, but not limited to, (i) facsimile image of the physical card, and poses and animated movements including, but not limited to, (ii) emergence, (ii) dynamic idle, (iii) attack/defend, (iv) conclusion on win, (v) conclusion on loss, and others. Using the row in data table (904) for Creature:Spider 897 for illustrative purpose, the cell within the field "card image" points to a file (905) in storage on the Gaming Server (200) that is a facsimile image (906) of the physical card identified as Creature:Spider 897. Similarly, the cell in the field "attack defend" points to a holographic animation file showing Creature:Spider 897 in an attack/defend pose (908). All such images and holographic animation files (e.g., (906) and (908)) are transmitted to the AR goggle (801) for display as required in accordance with the rules of the TCG being played. Certain cells in data table (904) will logically be empty based on the rules of the TCG being played. For example, an artifact Game Component will have empty cells for "attack defend", "conclusion win" and "conclusion loss" fields since this Game Component does not engage in battles.

The Gamer can access data contained in data table (901) through the publisher's deck building or other web sites to build deck, review gaming history, develop gaming strategy, or perform activities related to enhancing gaming skill and experience. Using a web interface available on its deck building or other web sites, the publisher of the TCG can also provide additional data allowing Gamers to assess the market value, rarity, vintage, quantity in existence, or other relevant information associated with the collectability of the portfolio of trading cards owned.

Figure 10:
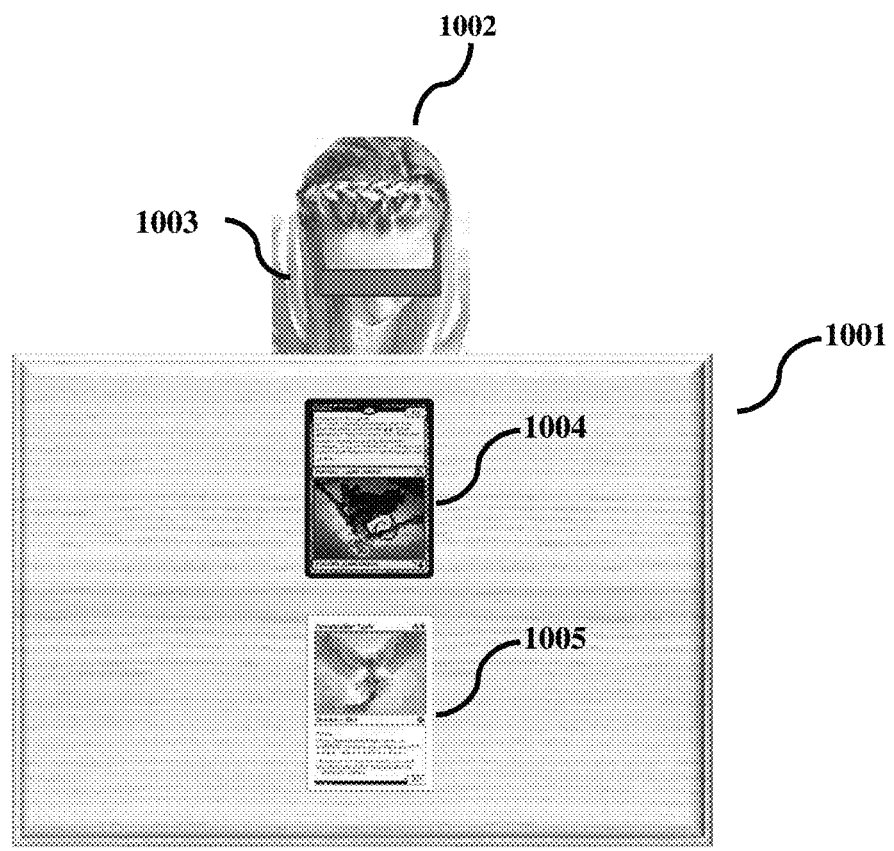
FIG. 10 is a diagram showing how an AR goggle is used as a gaming device when playing a classical TCG using physical cards.

FIG. 10 is a diagram showing how an AR goggle is used as a gaming device when playing a classical TCG using physical cards.

In this diagram, the Gamer (1002) is seen wearing an AR goggle (1003) as the gaming device. The TCG is played with a plurality of physical cards placed on the field of play (in this example, a table) (1001) with the Gamer's card(s) (1004) being used to play against an opponent's card(s) (1005). Except for the enhanced user experience and content offered by the AR goggle, all aspects of the user experience playing traditional TCG using physical cards remains the same. The (i) identity of the opposing Game Components as depicted in both opposing cards (1004) and (1005), (ii) any enhancements to the opposing Game Components applicable thereof as described in FIG. 16 and FIG. 17, and (iii) the hand gesture commands of both Gamers as detected by the built-in or externally attached sensor of the AR goggle are sent to the Gaming Server (200) via data network (202) as Input Parameters. Based on the Input Parameters from both Gamers, the Gaming Server will generate the Output Parameters in accordance with the rules of the TCG being played, and send back to the AR goggles of the Gamers. Holographic animation of the 3D model of the Game Components as seen by the Gamers using the AR goggles and related hand gesture commands can also be transferred to eSports channels for broadcasting.

Figure 11:
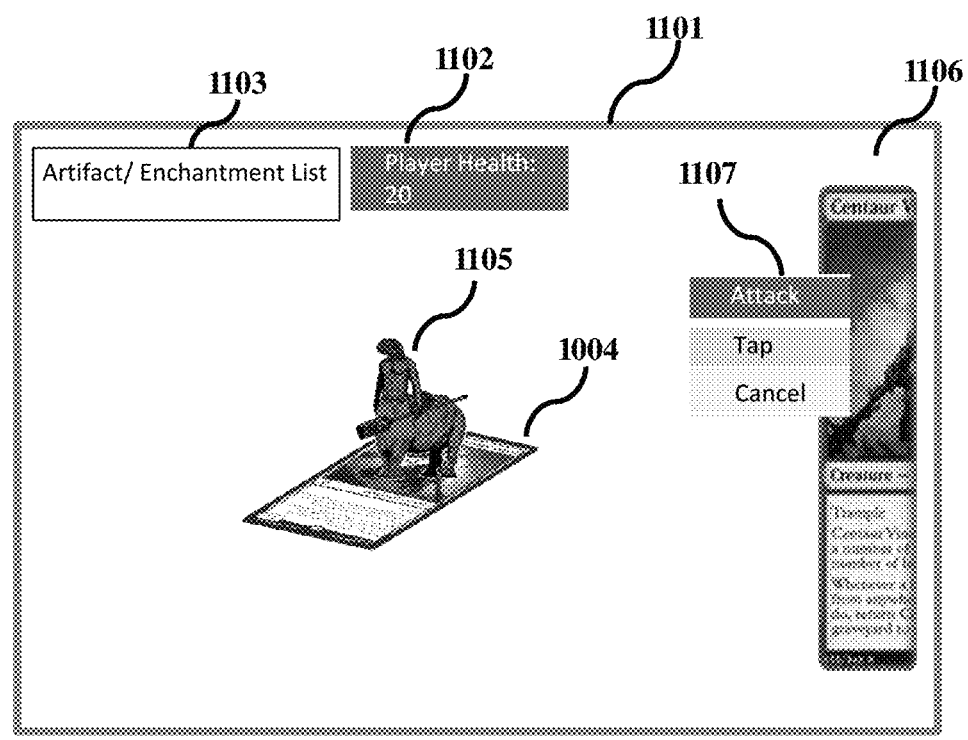
FIG. 11 is a diagram showing a view as seen by the Gamer within the FOV of an AR goggle with one physical card placed in the field of play.

FIG. 11 is a diagram showing a view as seen by the Gamer within the FOV of an AR goggle with one physical card placed in the field of play.

For ease of illustration, the physical cards shown in FIG. 11 through FIG. 17 are shown without the protective sleeve that bears the barcode (702). A bar code affixed to a protective sleeve or the physical card will be needed if the barcode bearing the unique serial number (i.e., not based on image recognition) is used to identify the Game Component in play. If image recognition software is used, barcode will not be needed.

Within the FOV of the AR goggle, the physical card (1004) on the field of play is seen through the lens of the AR goggle. Once the user selected the card using the appropriate hand gesture (e.g. pinch using the fore finger and thumb) as recognized by the built-in or externally attached sensor of the AR goggle, the built-in or externally attached camera of the AR goggle will scan and identify the Game Component using the affixed barcode or Identity Markers. After the Game Component has been identified, a process described in FIG. 9 will be executed to transmit the appropriate holographic animation file(s) to the AR goggle. The AR goggle will play the holographic animation file(s) and projected a holographic image (1105) of the 3D model of the Game Component onto a location of the FOV so as to create the appearance that the holographic image arises from the card and then assume a "dynamic idle" pose on top of the physical card as viewed through the lens of the AR goggle. A facsimile image of the physical card (906) will also be sent to the AR goggle per the process described in FIG. 9 and partially displayed on the edge of the FOV (1106) so as not to obscure the view of the Gamer. Depending on the rules of the TCG being played, an action menu (1107) might also appear in the FOV (1107). Input Parameters are recorded and send to the Game Server (200) through action of the Gamer by either (i) selecting from the action menu using the appropriate hand gesture recognized by the AR goggle, or (ii) moving the physical card using the appropriate hand motion in accordance with the rules of the TCG and sensed by the built-in or attached hand gesture sensor of the AR goggle. Items (i) and (ii) noted above constitute the range of hand gesture commands applicable during gameplay.

For convenience to the Gamer, a scoreboard (1102) and "artifact/enchantment list" (1103, to be described in FIG. 16) can also be seen within the FOV of the AR goggle. The Gamer's score is kept by the Game Server (200) in accordance with the rules of the TCG being played.

Figure 12:
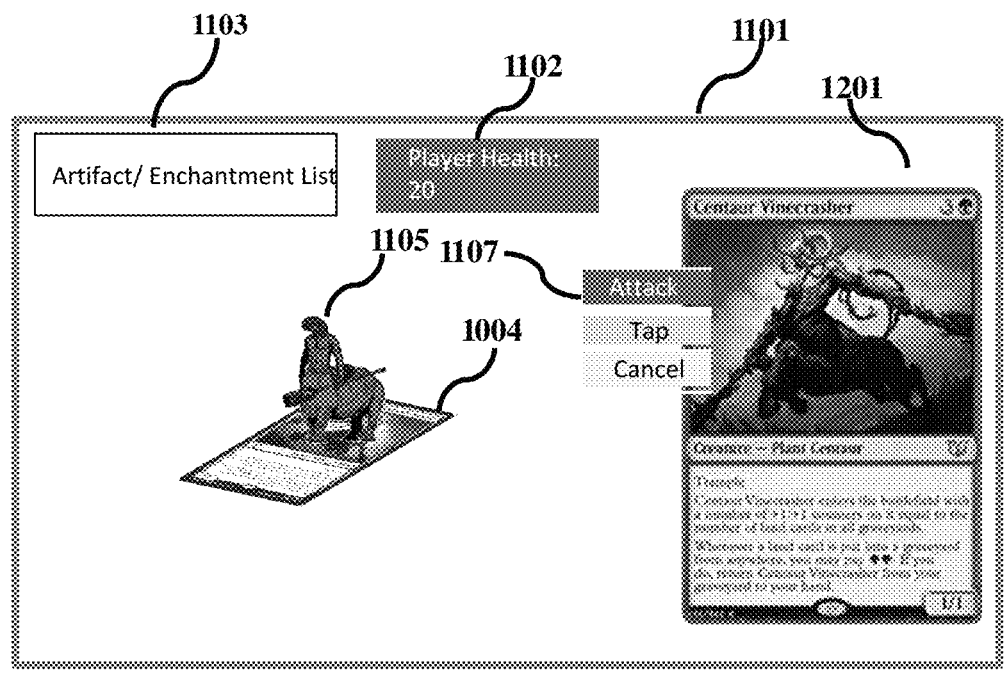
FIG. 12 is a diagram showing a view as seen by the Gamer within the FOV of an AR goggle with one physical card placed in the physical field of play and with the facsimile image of the card being in full display.

FIG. 12 is a diagram showing a view as seen by the Gamer within the FOV of an AR goggle with one physical card placed in the physical field of play and with the facsimile image of the card being in full display.

A facsimile image of the physical card in play is retrieved from the Gaming Server (200) and is partially displayed at the edge of the FOV to avoid obscuring the view of the Gamer through the AR goggle's lens. For the Gamer to be able to view the complete image of the card so as to be able to comfortably read its instructions, capabilities, etc., he/she will slightly turn his/her head towards the direction of the image of the card. The AR goggle will sense the movement and pan the image into view in tandem with the head movement until the complete image of the card is within the FOV (1201).

Figure 13:
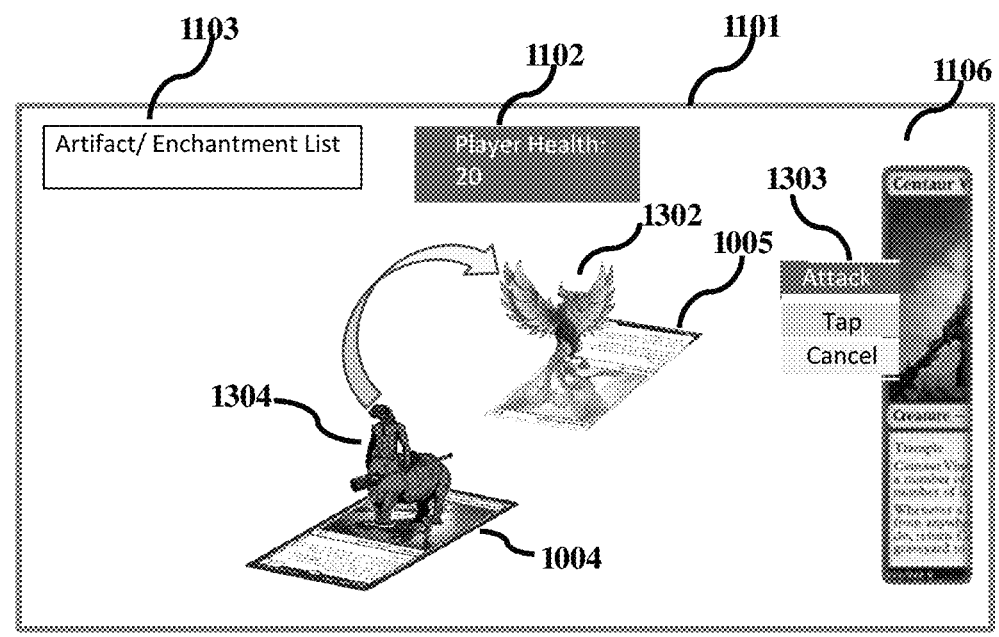
FIG. 13 is a diagram showing a view as seen by the Gamer within the FOV of an AR goggle as an offensive or defensive action is initiated against an opponent using physical cards.

FIG. 13 is a diagram showing a view as seen by the Gamer within the FOV of an AR goggle as an offensive or defensive action is initiated against an opponent using physical cards.

In the course of playing a TCG, the Gamer's card (1004) and the opponent's card (1005) will be placed in the field of play (1001). When the opponent selected his/her card (1005) for battle and if said card is within the Gamer's FOV, the Gamer will be able to observe a holographic image of the opponent's Game Component arises from the opponent's card and assume the "dynamic idle" pose (1302). As the opponents prosecutes the TCG as described in FIG. 4 items (404) through (407) using (i) the action menu (1303) or (ii) hand motion manipulating the physical cards, different holographic animation files of the 3D models of the affected Game Components will be retrieved from storage and transmitted to the AR goggle for display in accordance with the process described in FIG. 9. Holographic animated movements (1302 and 1304) of the 3D models of the Game Components are displayed in sequence from "dynamic idle", "attack defend" to "conclusion win" or "conclusion loss" while superimposed upon the respective physical cards (1302 and 1302) as viewed by the Gamer through his/her AR goggle.

At any time during the gameplay experience, the Gamer can purchase 3D-printed figures of the 3D model of Game Components in various poses (1302 and 1304) ranging from "emergence", "dynamic idle", "attack defend" to "conclusion win" or "conclusion loss" through a special user interface on the AR goggle or online through the TCG publisher's website.

Figure 14:
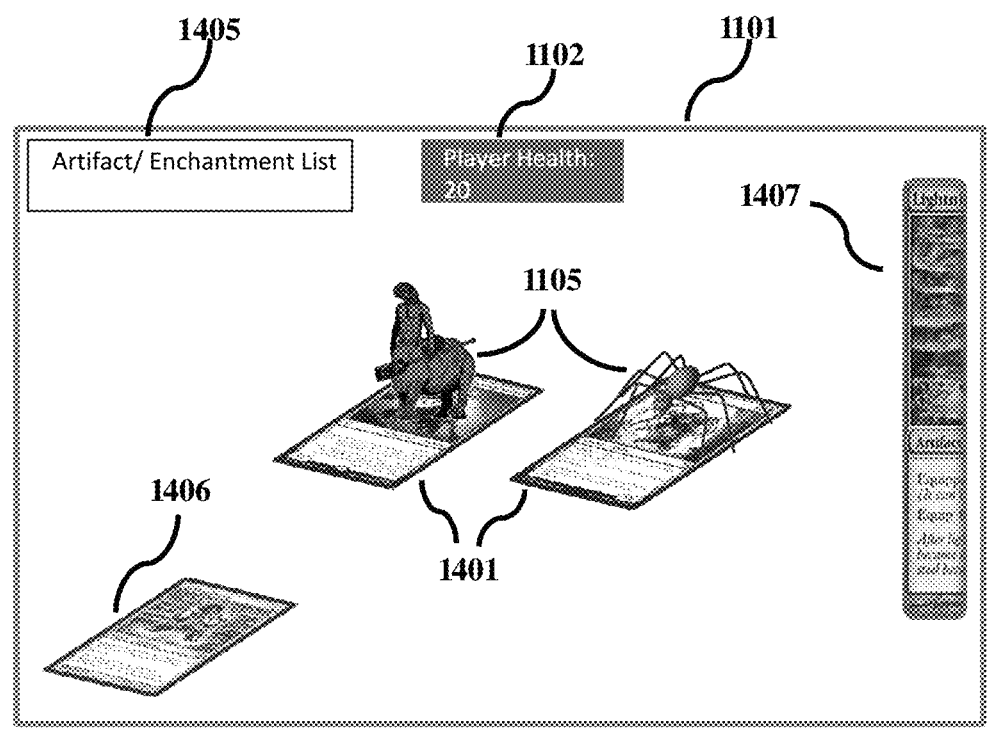
FIG. 14 is a diagram showing a view as seen by the Gamer within the FOV of an AR goggle when a special physical artifact or enchantment card is placed in the field of play.

FIG. 14 is a diagram showing a view as seen by the Gamer within the FOV of an AR goggle when a special physical artifact or enchantment card is placed in the field of play.

A special artifact or enchantment card provide special capabilities to a selected Game Component in accordance with the rules of the TCG being played. When a special artifact or enchantment card is placed within the field of play and selected by the Gamer through hand gesture recognized by the AR goggle, the special artifact or enchantment card will be scanned to identify the Game Component depicted by such special artifact or enchantment card, and how it impacts the plurality of Game Components in play (1401). Once the Gamer applies the special capabilities to a particular Game Component in play (see FIG. 16), the information display (1405) will be updated to list the special capabilities so that the Gamer does not have to memorize the capabilities and effects of each special artifact or enchantment card. A partial view of the facsimile image of the special artifact or enchantment card will also be displayed at one edge of the FOV.

Figure 15:
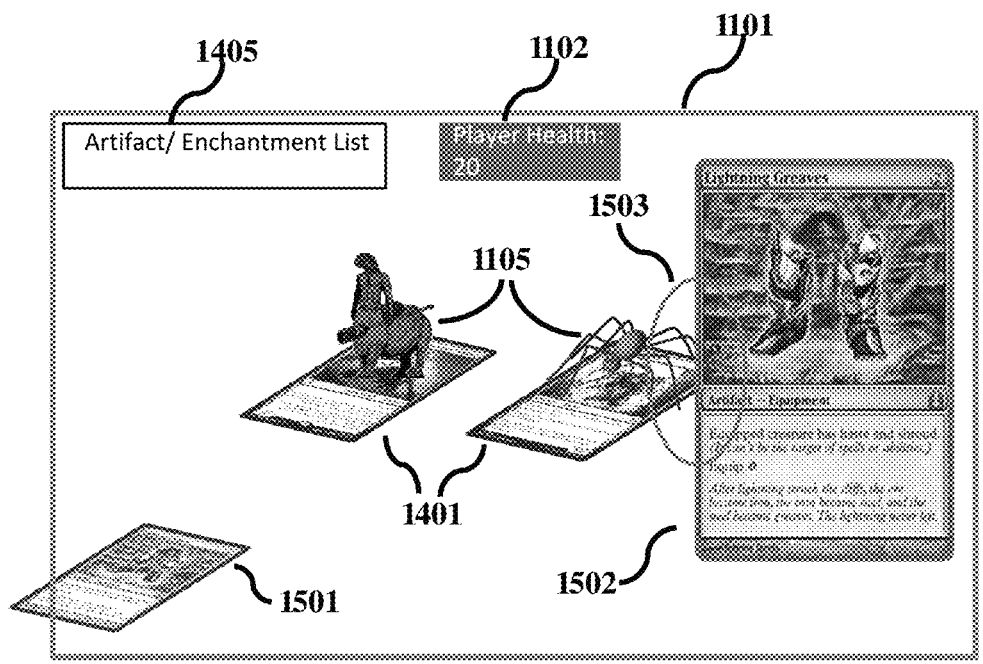
FIG. 15 is a diagram showing a view as seen by the Gamer within the FOV of an AR goggle when a special physical artifact or enchantment card is placed in the field of play and with the facsimile image of the card being in full display.

FIG. 15 is a diagram showing a view as seen by the Gamer within the FOV of an AR goggle when a special physical artifact or enchantment card is placed in the physical field of play and with the facsimile image of the card being in full display.

In the event that the Gamer desires to read the instruction printed in small font on the special artifact or enchantment card, he/she can turn his/her head slightly in the direction of the partial view of the image of the special artifact or enchantment card (1407). The image of the card will pan into view synchronously with the movement of the Gamer's head (1502). If there are multiple physical cards in the FOV, the full image of a regular card or a special artifact or enchantment card will appear to "float" over the physical cards on the field of play (1001) as viewed through the lens of the AR goggle (1503).

Figure 16:
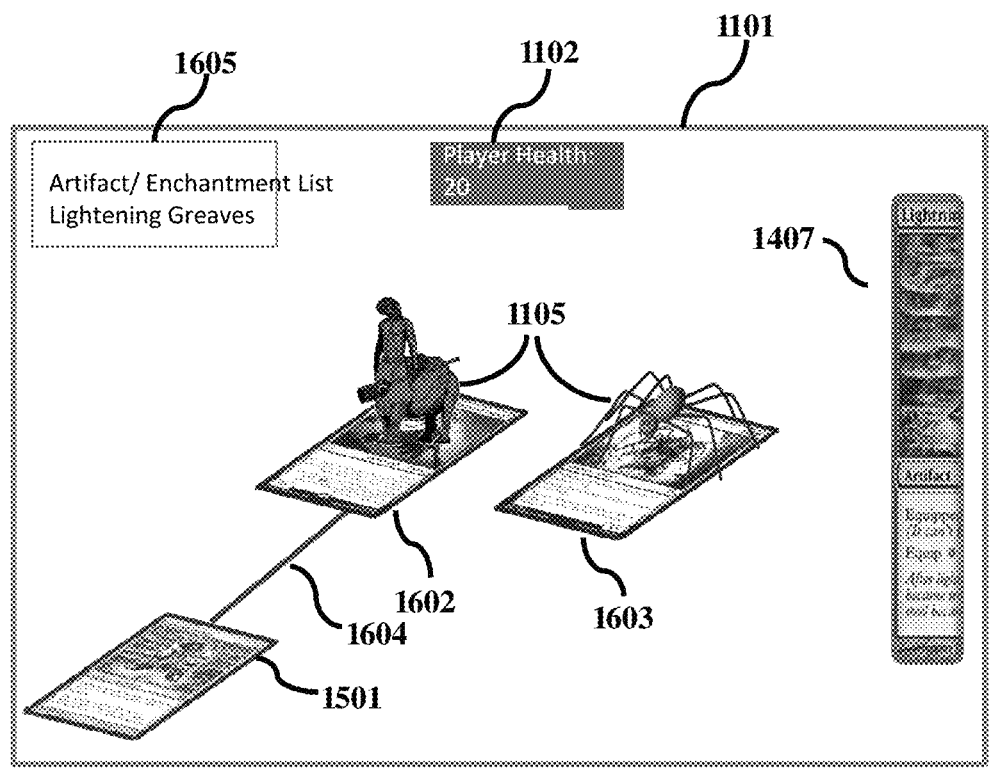
FIG. 16 is a diagram showing a view as seen by the Gamer within the FOV of an AR goggle when a special physical artifact or enchantment card is placed in the field of play and enhances the capabilities of selected Game Component(s) depicted in certain physical card(s) in accordance with the rules of the TCG.

FIG. 16 is a diagram showing a view as seen by the Gamer within the FOV of an AR goggle when a special physical artifact or enchantment card is placed in the field of play and enhances the capabilities of selected Game Component(s) depicted in certain physical card(s) in accordance with the rules of the TCG.

There is a variety of ways a Gamer can apply the capabilities of a special artifact or enchantment card (1501) to a particular Game Component as depicted by a card (1602) in play. This could include, but not limited to, having the Gamer draws an imaginary line on the field of play (1001) between the special artifact or enchantment card and the selected card (1602). The finger motion making the connection will be detected by the AR goggle's build-in or externally mounted hand gesture sensor. A virtual line can be projected by the AR goggle between the two cards (1604) to indicate that the application has been applied. Such selection will not affect the Game Component (e.g., 1603) that has not been selected. The preferred way of making the association between the two cards (1501) and (1602) will be determined by the capability of the AR google in use.

Prior to the application of special capabilities to a Game Component in play, the information box (1504) could be "greyed out" or displayed in a faded color. Once the application is applied, the special capabilities thus applied in accordance with the rules of the TCG being played will be listed in the information box (1605) and the appearance of the information box will become more pronounced (not "greyed out") to attract the attention of the Gamer.

Figure 17:
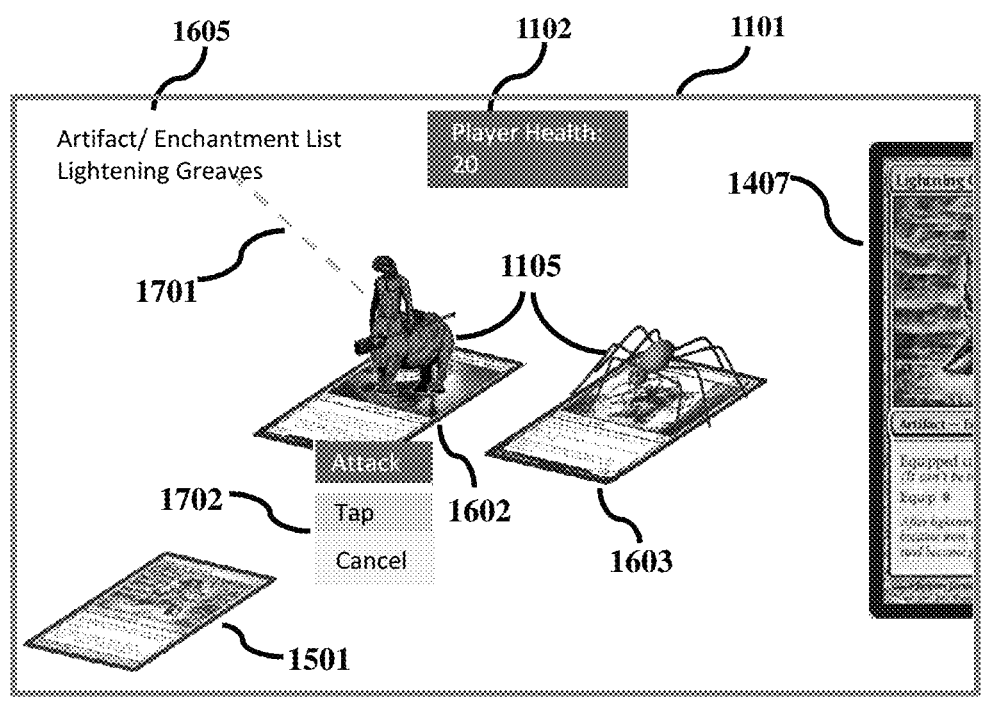
FIG. 17 is a diagram showing a view as seen by the Gamer within the FOV of an AR goggle when a Game Component, whose capability is enhanced by a special artifact or enchantment card in accordance with the rules of the TCG, is ready to engage an opponent's Game Component.

FIG. 17 is a diagram showing a view as seen by the Gamer within the FOV of an AR goggle when a Game Component, whose capability is enhanced by a special artifact or enchantment card in accordance with the rules of the TCG, is ready to engage an opponent's Game Component.

Once the association between the special artifact or enchantment card (1601) and the selected card (1602) has been made, a marking (1701) will appear that links the selected card (1602) to an entry in the information box (1605). The Gamer does not have to memorize whether special capabilities have been applied to a particular Game Component when he/she is launching an action (1702) against an opponent.

Figure 18:
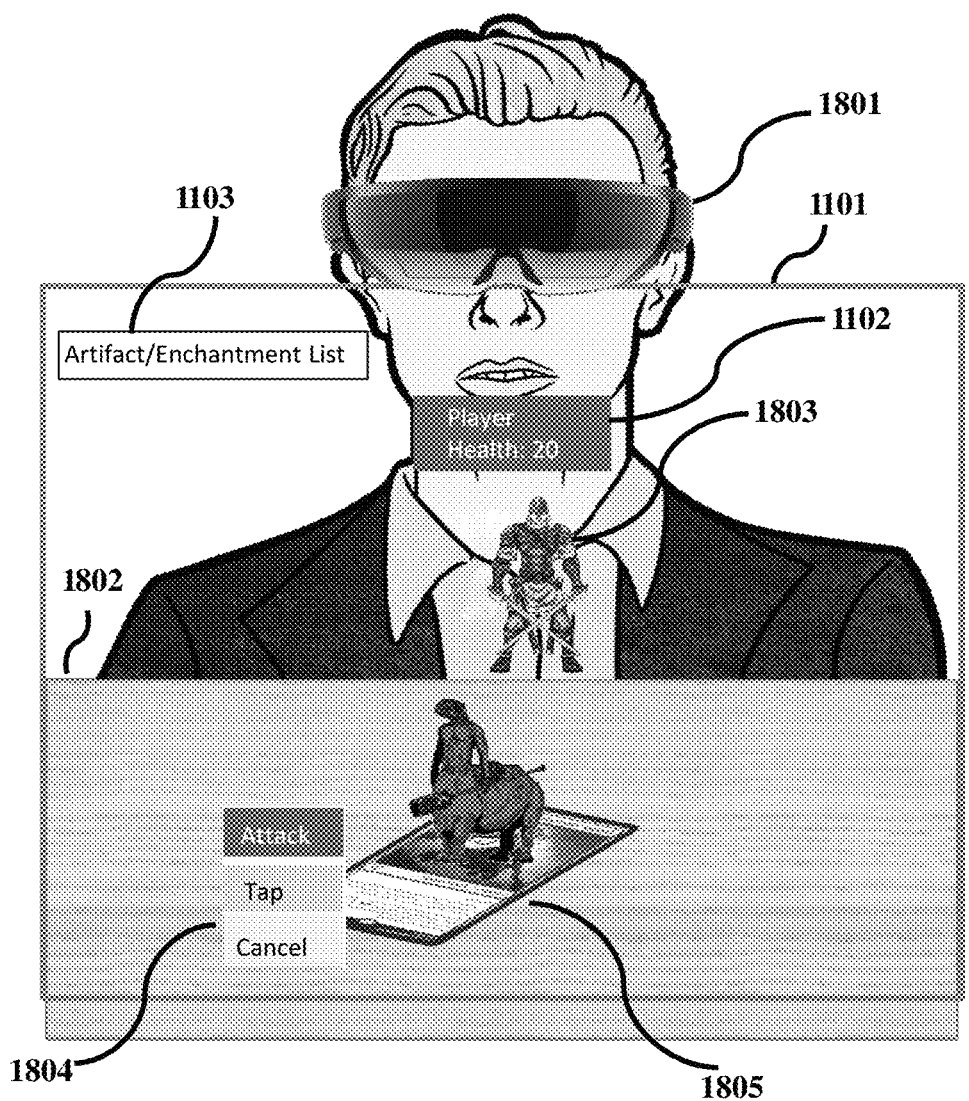
FIG. 18 is a diagram showing a view of the opposing Gamer with his/her avatar appearing in the FOV and open to attack by a Game Component in play.

FIG. 18 is a diagram showing a view of the opposing Gamer with his/her avatar appearing in the FOV and open to attack by a Game Component in play.

When playing against a face-to-face opponent, the opposing Gamer (1801) can be seen through the lens of the AR goggle appearing next to the field of play (1802). In accordance with the rules of certain TCG, the Gamer can use appropriate hand gesture commands recognizable by the AR goggle (1804) or via the action menu to command Game Components (1805) to directly attack the person of the opposing Gamer to reduce his/her health points. In playing such TCG using AR goggles as the Gaming Device, the person of the opposing Gamer can be shown as an animated holographic image of an avatar (1803) selected by the opposing Gamer prior to the commencement of gameplay. Depending on the state (or progress) of play and in accordance with the rules of the TCG being played, the avatar can display a number of animated movements including, but not limited to, (i) "dynamic idle" showing the avatar ready for gameplay, (ii) "vitalized" showing the avatar gaining strength due to an accumulation of health points, or (iii) "expiration" showing the avatar in a diminished state resulting from the depletion of health points. These animation files are retrieved from storage in the Gaming Server (200) in accordance with the rules of the TCG being played, and displayed by the HUD within the Gamer's AR goggle.

In face-to-face gameplay with an opposing Gamer, the avatar will appear within the FOV directly in front of the opposing Gamer when the Gamer lift his/her head to view the opposing Gamer. In the event of remote gameplay, the avatar will appear floating in space within the FOV above the field of play when the Gamer lift his/her head.

Figure 19:
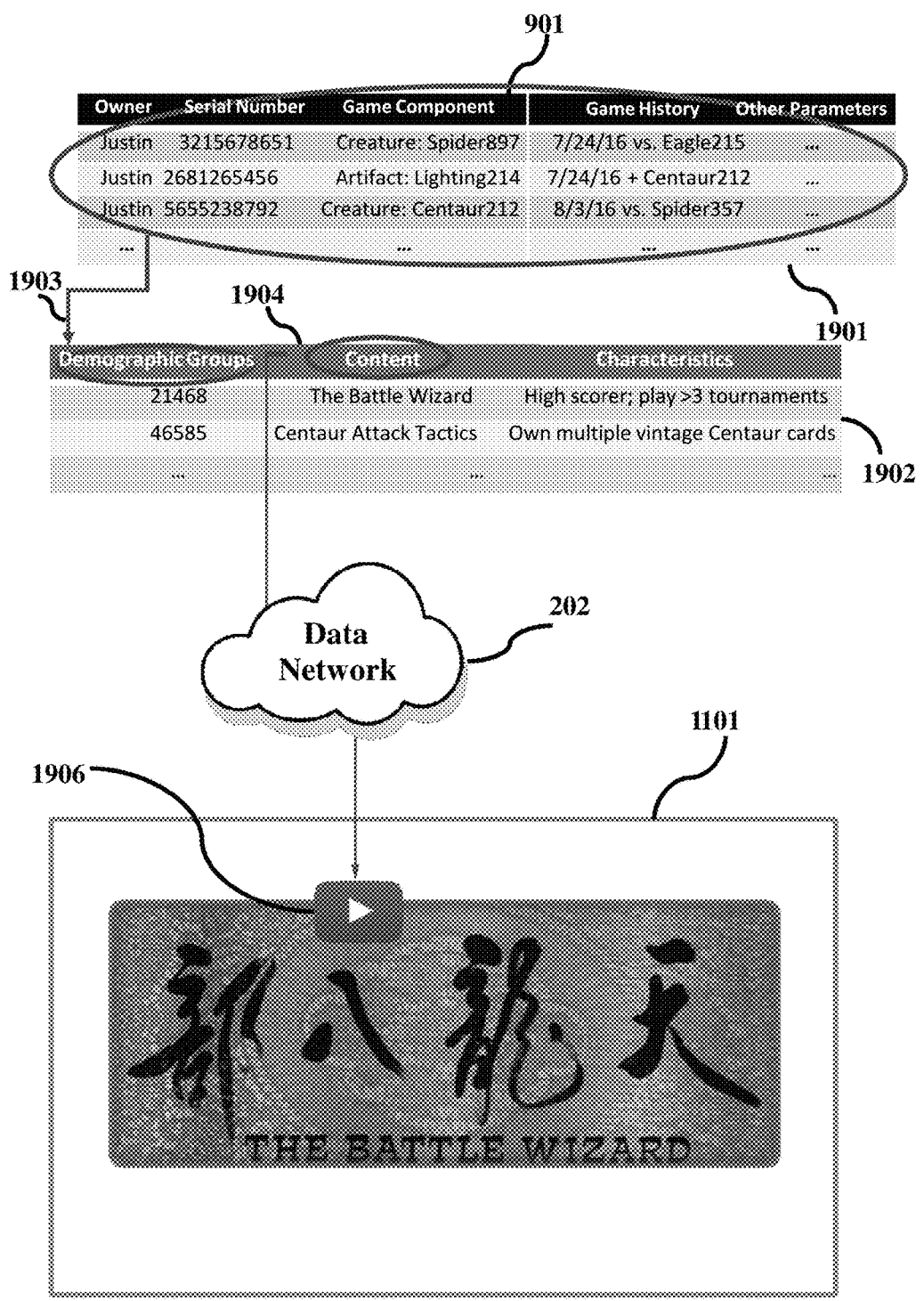
FIG. 19 is a diagram showing a view as seen by the Gamer within the FOV of an AR goggle when certain video content is played. A data flow diagram also shows how such targeted content is selected to be played for the Gamer.

FIG. 19 is a diagram showing a view as seen by the Gamer within the FOV of an AR goggle when certain video content is played. A data flow diagram also shows how such targeted content is selected to be played for the Gamer.

A use of the data collected in database (201) is to provide an enhanced game playing experience through delivering digital content that is tailored to the Gamer's specific card ownership, gaming history, areas for skill improvement, and other relevant parameters. Data in data table (901) of the database (201) can be analyzed to determine the Gamer's playing style, interest, preference (1901) or other factors so that he/she can be classified into specific demographic groups (1903). Digital content targeted at each group (1904) can be transmitted to the AR goggle for play-back before, after or during a break in gaming action, or at any time as controlled by the Gamer through a user interface. Types of content include, but not limited to, holographic animated "movie" of TCG related characters, podcast, images, bonus video games, instructional video, advertisement, special product offerings, etc. The content is retrieved from storage within the Gaming Server (200) based on the entry in data table (1902) linking the demographic groups to the appropriate content. There can be multiple rows (or content) in table (1902) for each group, and each Gamer can belong to multiple groups.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Accordingly, the disclosure of the present invention is intended to be illustrative, but not limiting, of the scope of the invention, which is set forth in the following claims.

The invention claimed is:

1. A computer-implemented method to deliver enhanced augmented reality gameplay experience for Trading Card Games, the computer-implemented method includes:
    scanning one or more relevant cards prior to a gaming session;
    identifying a Game Component depicted in a physical card of the one or more relevant cards by scanning one of an identification barcode and Identity Markers on the physical card;
    transmitting a unique serial number encoded in one of the identification barcode and interpreted from the Identity Markers to a database maintained at a Gaming Server;
    associating the unique serial number with the scanned physical card and the database;
    setting up a gaming session with a plurality of Gamers through a user interface, wherein the gaming session is conducted by one of face-to-face environment and remotely among geographically dispersed Gamers;
    scanning one or more relevant cards and identifying the game component represented by the relevant cards;
    retrieving a pre-defined sequence of animated movements of a 3D model of the game component from the database by the game server using the unique serial number or identification barcode or the Identity Markers or image processing of image in the relevant cards;
    superimposing the sequence of animated movements onto the image of the trading card as captured by the camera of the gaming device, thereby giving the effect of the animated 3D model augmenting the real image of the static trading card so that the game component appears to be alive;
    capturing one or more actions taken on the game components by the Gamer by a plurality of Input Parameters;
    detecting information on the actions captured and subsequently sending the information to the gaming server through the data network;
    generating Outcome Parameters by logically matching the one or more actions taken with the cards in play against one or more actions and cards in play by the opposing Gamer;
    superimposing the actions of the Outcome Parameters thereby giving the effect of the animated 3D model augmenting the real image of the static trading card to display the consequence of the Gamers one or more actions; and
    completing the gaming session until the end is reached, the end is defined by the rules of the TCGs being played.

2. The computer-implemented method of claim 1 and further comprising:
    permitting a Gamer to initiate a gaming session thereby logging the Gamer into an application to perform the computer-implemented method and a gaming server.

3. The computer-implemented method of claim 2 wherein initiating further comprises:
    allowing a Gamer to download a specialized TCG playing application to a gaming device, wherein the application controls the camera and motion detector on the gaming device; and
    permitting the Gamer to register a collection of trading cards related to the TCGs.

4. The computer-implemented method of claim 3 and further comprising:
    permitting the Gamer to enter contact information of other Gamers who should be invited to participate in future gaming sessions; and
    contacting the invitees through a suitable communication preferred by the publisher of the trading cards requesting their acknowledge of the invitation.

5. The computer-implemented method of claim 1 wherein retrieving the sequence of animated movements further comprises:
    sending the sequence of animated movements to the gaming device through the data network; and
    retrieving gaming rules from the database.

6. The computer-implemented method of claim 1 wherein the Input Parameters includes identity of the trading card in play, the action taken by the Gamer as detected by the Gaming Device's camera or motion detection device and pre-defined rules of the TCGs.

7. The computer-implemented method of claim 1 and further comprising:
    sending Input Parameters and Outcome Parameters of each step of the gaming session to an ESports channel for broadcast to an audience who are non-participant Gamers.

8. The computer-implemented method of claim 1 and further comprising:
    storing the Outcome Parameters in the database for score keeping purposes; and sending the Outcome Parameters for each game component to the participating Gamers.

9. The computer-implemented method of claim 1 wherein the gaming session is conducted as a broadcasted program on eSports channels while preserving the traditional tactile gameplay experience.

10. The computer-implemented method of claim 1 and further comprising:
    analyzing data stored in the database to determine the Gamer's playing style, interest,
    preference, and other factors thereby classifying the Gamer into a specific demographic group; and
    allowing the Gamer to access a subset of the data stored in the database to perform activities related to enhancing gaming skill and experience, and assessing value of trading cards collection.

11. The computer-implemented method of claim 1 and further comprising:
displaying targeted digital content to the demographic group, wherein the content is retrieved from the Gaming Server based on the data linking the demographic groups to the appropriate content, wherein the digital content included entertainment, tutorial and advertising.

12. The computer-implemented method of claim 1 and further comprising:
displaying holographic animated movements of the Game Components in sequence to the Gamer;
allowing the Gamer to purchase 3D-printed figures based on the Game Components in a plurality of poses through a dedicated user interface; and
enabling the 3D-printed figures to be used in board games.

13. The computer-implemented method of claim 1 and further comprising:
associating a unique serial number encoded in a barcode or deduced from the Identity Markers of a scanned physical card and data stored in a database.

14. The computer-implemented method of claim 1 and further comprising:
displaying in the FOV a facsimile image of the card in play as selected by the Gamer with the image in full or partial view as determined by the Gamer's head position;
displaying a scoreboard, an action menu and an artifact list with the FOV, wherein the action menu includes a list of actions that the Gamer selects;
scanning a special artifact card to identify the Game Component depicted in response to the Gamer selecting a special artifact through hand gestures; and
updating the list with the special capabilities of the special artifact.

15. The computer-implemented method of claim 14 and further comprising:
allowing a Gamer to apply the capabilities of a special artifact card to a specific Game Component as depicted by a card in play through multiple methods;
listing the special capabilities in a box wherein the appearance of the box is highlighted to attract the attention of the Gamer; and
marking a link between a selected card to an entry in the box.

16. The computer-implemented method of claim 1 and further comprising:
representing the opposing Gamer as an avatar displayed to the Gamer in the FOV;
enabling the Gamer to direct attack, in accordance with the rules of the TCG being played, at the avatar using the Game Components represented by the Gamer's cards in play;
directing such attack using hand gesture and/or action menu; and
displaying holographic animated movements of the avatar in sequence to the Gamer in accordance with the rules of the TCG and magnitude of the opposing Gamer's health points.

17. The computer-implemented method of claim 1 and further comprising:
storing a plurality of data in the database, wherein the data collectively includes a paired serial number with Game Component's identification information and the Gamer's identification, wherein the data is stored in a Gamer data table in the database and wherein the data table defines the appearance of the Game Component and its physical card.

18. A computer program product stored on a non-transitory computer-readable medium that when executed by a processor, performs a method to deliver enhanced augmented reality gameplay experience for Trading Card Games, the computer program product includes:
scanning one or more relevant cards prior to a gaming session;
identifying a Game Component depicted in a physical card of the one or more relevant cards by scanning one of an identification barcode and Identity Markers on the physical card;
transmitting a unique serial number encoded in one of the identification barcode and interpreted from the Identity Markers to a database maintained at a Gaming Server;
associating the unique serial number with the scanned physical card and the database;
setting up a gaming session with a plurality of Gamers through a user interface, wherein the gaming session is conducted by one of face-to-face environment and remotely among geographically dispersed Gamers;
scanning one or more relevant cards and identifying the game component represented by the relevant cards;
retrieving a pre-defined sequence of animated movements of a 3D model of the game component from the database by the game server using the unique serial number or identification barcode or the Identity Markers or image processing of image in the relevant cards;
superimposing the sequence of animated movements onto the image of the trading card as captured by the camera of the gaming device, thereby giving the effect of the animated 3D model augmenting the real image of the static trading card so that the game component appears to be alive;
capturing one or more actions taken on the game components by the Gamer by a plurality of Input Parameters;
detecting information on the actions captured and subsequently sending the information to the gaming server through the data network;
generating Outcome Parameters by logically matching the one or more actions taken with the cards in play against one or more actions and cards in play by the opposing Gamer;
superimposing the actions of the Outcome Parameters thereby giving the effect of the animated 3D model augmenting the real image of the static trading card to display the consequence of the Gamers one or more actions; and
completing the gaming session until the end is reached, the end is defined by the rules of the TCGs being played.

19. The computer program product of claim 18 and further comprising:
permitting a Gamer to initiate a gaming session thereby logging the Gamer into an application to perform the computer-implemented method and a gaming server.

20. The computer program product of claim 19 wherein initiating further comprises:
allowing a Gamer to download a specialized TCG playing application to a gaming device, wherein the application controls the camera and motion detector on the gaming device; and
permitting the Gamer to register a collection of trading cards related to the TCGs.

21. The computer program product of claim 20 and further comprising:
   permitting the Gamer to enter contact information of other Gamers who should be invited to participate in future gaming sessions; and
   contacting the invitees through a suitable communication preferred by the publisher of the trading cards requesting their acknowledge of the invitation.

22. The computer program product of claim 18 wherein retrieving the sequence of animated movements further comprises:
   sending the sequence of animated movements to the gaming device through the data network; and
   retrieving gaming rules from the database.

23. The computer program product of claim 18 wherein the Input Parameters includes identity of the trading card in play, the action taken by the Gamer as detected by the Gaming Device's camera or motion detection device and pre-defined rules of the TCGs.

24. The computer program product of claim 18 and further comprising:
   sending Input Parameters and Outcome Parameters of each step of the gaming session to an ESports channel for broadcast to an audience who are non-participant Gamers.

25. The computer program product of claim 18 and further comprising:
   storing the Outcome Parameters in the database for score keeping purposes; and
   sending the Outcome Parameters for each game component to the participating Gamers.

26. The computer program product of claim 18 wherein the gaming session is conducted as a broadcasted program on eSports channels while preserving the traditional tactile gameplay experience.

27. The computer program product of claim 18 and further comprising:
   analyzing data stored in the database to determine the Gamer's playing style, interest, preference, and other factors thereby classifying the Gamer into a specific demographic group; and
   allowing the Gamer to access a subset of the data stored in the database to perform activities related to enhancing gaming skill and experience, and assessing value of trading cards collection.

28. The computer program product of claim 18 and further comprising:
   displaying targeted digital content to the demographic group, wherein the content is retrieved from the Gaming Server based on the data linking the demographic groups to the appropriate content, wherein the digital content included entertainment, tutorial and advertising.

29. The computer program product of claim 18 and further comprising:
   displaying holographic animated movements of the Game Components in sequence to the Gamer;
   allowing the Gamer to purchase 3D-printed figures based on the Game Components in a plurality of poses through a dedicated user interface; and
   enabling the 3D-printed figures to be used in board games.

30. The computer program product of claim 18 and further comprising:
   associating a unique serial number encoded in a barcode or deduced from the Identity Markers of a scanned physical card and data stored in a database.

31. The computer program product of claim 18 and further comprising:
   displaying in the FOV a facsimile image of the card in play as selected by the Gamer with the image in full or partial view as determined by the Gamer's head position;
   displaying a scoreboard, an action menu and an artifact list with the FOV, wherein the action menu includes a list of actions that the Gamer selects;
   scanning a special artifact card to identify the Game Component depicted in response to the Gamer selecting a special artifact through hand gestures; and
   updating the list with the special capabilities of the special artifact.

32. The computer program product of claim 31 and further comprising:
   allowing a Gamer to apply the capabilities of a special artifact card to a specific Game Component as depicted by a card in play through multiple methods;
   listing the special capabilities in a box wherein the appearance of the box is highlighted to attract the attention of the Gamer; and
   marking a link between a selected card to an entry in the box.

33. The computer program product of claim 18 and further comprising:
   representing the opposing Gamer as an avatar displayed to the Gamer in the FOV;
   enabling the Gamer to direct attack, in accordance with the rules of the TCG being played, at the avatar using the Game Components represented by the Gamer's cards in play;
   directing such attack using hand gesture and/or action menu; and
   displaying holographic animated movements of the avatar in sequence to the Gamer in accordance with the rules of the TCG and magnitude of the opposing Gamer's health points.

34. The computer program product of claim 18 and further comprising:
   storing a plurality of data in the database, wherein the data collectively includes a paired serial number with Game Component's identification information and the Gamer's identification, wherein the data is stored in a Gamer data table in the database and wherein the data table defines the appearance of the Game Component and its physical card.

35. A system to deliver enhanced augmented reality gameplay experience for Trading Card Games, the system comprising:
   multiple gaming devices to enhance the user experience through augmented reality while playing TCGs against one face-to-face Gamers and remote Gamers, wherein the gaming devices are configured with a camera and motion sensing capability and wherein the camera captures an image of one or more game components depicted in the trading card in play;
   a gaming server to control the flow of the game and operated by one of the publishers of the trading cards used in a particular TCGs and any third-party interested in providing this game play experience;
   a deck of trading cards for a particular TCGs, wherein the trading cards is composed with game components;
   a processing module configured within the gaming device and operable to perform:
   scan one or more relevant cards prior to a gaming session;

identify a Game Component depicted in a physical card of the one or more relevant cards by scanning one of an identification barcode and Identity Markers on the physical card;

transmit a unique serial number encoded in one of the identification barcode and interpreted from the Identity Markers to a database maintained at a Gaming Server;

associate the unique serial number with the scanned physical card and the database;

scan one or more relevant cards and identifying a game component represented by the relevant cards;

retrieve a pre-defined sequence of animated movements of a 3D model of the game component from the database by the game server using the unique serial number or identification barcode or the Identity Markers or image processing of image in the relevant cards;

superimpose the sequence of animated movements onto the image of the trading card as captured by the camera of the gaming device, thereby giving the effect of the animated 3D model augmenting the real image of the static trading card so that the game component appears to be alive;

capture one or more actions taken on the game components by the Gamerby a plurality of Input Parameters;

detect information on the actions captured and subsequently sending the information to the gaming server through the data network;

generate Outcome Parameters by logically matching the one or more actions taken with the cards in play against one or more actions and cards in play by the opposing Gamer;

superimpose the actions of the Outcome Parameters thereby giving the effect of the animated 3D model augmenting the real image of the static trading card to display the consequence of the Gamers one or more actions; and complete the gaming session until the end is reached, the end is defined by the rules of the TCGs being played.

36. The system of claim 35 and further comprising:
a user interface configured within the gaming device to set up a gaming session with a plurality of Gamers;
a data network to connect the multiple gaming devices to the gaming server.

37. The system of claim 35 and further comprising:
a database to store Gamer's login and account information, scores and other relevant data; and
an ESports channel to broadcast to an audience for one of on-demand viewing and live viewing of the gaming session.

38. The system of claim 35 and further comprising:
a card trading platform which serves as a community and marketplace for Gamers to auction or trade their cards to one another in a controlled, monitored environment to ensure minimum graft and conflict.

39. The system of claim 35 and further comprising:
a protective plastic sleeve that covers the physical cards to provide camera readable barcode and wherein the protective plastic sleeve protects the physical cards from wear and tear;
an AR google to scan the identified barcode and/or Identity Markers on a physical card to identify the Game Component depicted in the physical card; and
a built-in or an external camera attached in the AR google.

40. The system of claim 39 wherein a unique serial number is encoded in the barcode and wherein the unique serial number is associated with a Game Component represented by the physical card.

* * * * *